(12) United States Patent
Wei et al.

(10) Patent No.: US 12,450,812 B2
(45) Date of Patent: Oct. 21, 2025

(54) PHYSICAL SPECIAL EFFECT RENDERING METHOD AND APPARATUS, COMPUTER DEVICE, AND STORAGE MEDIUM

(71) Applicant: Tencent Technology (Shenzhen) Company Limited, Shenzhen (CN)

(72) Inventors: Chendi Wei, Shenzhen (CN); Li Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 252 days.

(21) Appl. No.: 18/198,168

(22) Filed: May 16, 2023

(65) Prior Publication Data

US 2023/0290032 A1    Sep. 14, 2023

Related U.S. Application Data

(63) Continuation of application No. PCT/CN2022/118750, filed on Sep. 14, 2022.

(30) Foreign Application Priority Data

Oct. 25, 2021 (CN) .......................... 202111237498.X

(51) Int. Cl.
  *G06T 13/60* (2011.01)
  *G06T 7/246* (2017.01)
  *G06T 15/00* (2011.01)

(52) U.S. Cl.
  CPC .............. *G06T 13/60* (2013.01); *G06T 7/246* (2017.01); *G06T 15/005* (2013.01);
  (Continued)

(58) Field of Classification Search
  CPC ....... G06T 13/60; G06T 7/246; G06T 15/005; G06T 2207/10016; G06T 2207/20021;
  (Continued)

(56) References Cited

U.S. PATENT DOCUMENTS 5,119,080 A  *  6/1992  Kajimoto ................. G09G 5/14
                                              345/620
6,421,089 B1 *  7/2002  Fran.cedilla.ois ... H04N 7/0122
                                              348/E5.111
(Continued)

FOREIGN PATENT DOCUMENTS

CN         104778737 A        7/2015
CN         106056660 A   *  10/2016
(Continued)

OTHER PUBLICATIONS

UnityEngine. Unity Documentation Scripting API Version 5.6 [Online]. Jul. 12, 2017 [Retrieved on Mar. 19, 2025]. Retrieved from the Internet: <https://docs.unity3d.com/560/Documentation/ScriptReference/index.html> (Year: 2017).*

(Continued)

*Primary Examiner* — King Y Poon
*Assistant Examiner* — Michelle Hau Ma
(74) *Attorney, Agent, or Firm* — Morgan, Lewis & Bockius LLP

(57) ABSTRACT

This application relates to a physical special effect rendering method performed by a computer device. The method includes: obtaining physical special effect data of physical special effect particles emitted by a particle emission plug-in in a previous frame; obtaining a first target instance obtained by instantiating a scene management class; invoking, through the first target instance, a scene manager of a particle simulation tool to calculate motion state information of the physical special effect particles in a current frame based on the physical special effect data in the previous frame; and updating the physical special effect data in the previous frame based on the motion state information of the current frame to render a physical special effect in the current frame.

17 Claims, 14 Drawing Sheets

(52) U.S. Cl.
CPC ........... *G06T 2207/10016* (2013.01); *G06T 2207/20021* (2013.01); *G06T 2215/16* (2013.01)

(58) Field of Classification Search
CPC ..... G06T 2215/16; G06T 13/20; G06T 15/00; G06F 9/451; G06F 3/0481
See application file for complete search history.

(56) References Cited

U.S. PATENT DOCUMENTS

| | | | |
|---|---|---|---|
| 2009/0083015 A1 | 3/2009 | McDaniel | |
| 2015/0187116 A1* | 7/2015 | Stomakhin | G06T 13/60 345/419 |
| 2019/0114819 A1 | 4/2019 | Kite et al. | |

FOREIGN PATENT DOCUMENTS

| | | | | |
|---|---|---|---|---|
| CN | 107392835 A | * | 11/2017 | ............ G06F 9/485 |
| CN | 110049371 A | | 7/2019 | |
| CN | 111741332 A | | 10/2020 | |
| CN | 112270732 A | | 1/2021 | |
| CN | 112446942 A | | 3/2021 | |
| CN | 112862942 A | | 5/2021 | |
| CN | 113223122 A | | 8/2021 | |
| CN | 113689534 A | | 11/2021 | |
| JP | 2004127005 A | * | 4/2004 | |

OTHER PUBLICATIONS

Mangal, Kirti. C# Inheritance [Online]. Jan. 23, 2019 [Date retrieved from Wayback Machine, Retrieved on Mar. 19, 2025]. Retrieved from the Internet: <https://www.geeksforgeeks.org/c-sharp-inheritance/> (Year: 2019).*

Wikipedia. Framebuffer [Online]. Sep. 13, 2020 [Retrieved on Mar. 19, 2025]. Retrieved from the Internet: <https://en.wikipedia.org/wiki/Framebuffer> (Year: 2020).*

Screenshots from YouTube video clip entitled "ScienceMan Digital Lesson—Physics—Interactive Physics Review" uploaded on Mar. 4, 2012 by user "ScienceMandotcom" [Retrieved on Mar. 19, 2025]. Retrieved from the Internet: <URL: https://www.youtube.com/watch?v=nCCC07bCAaE> (Year: 2012).*

Autodesk 3ds Max. Special Effects [Online]. 2010 [Retrieved on Jun. 24, 2025]. Retrieved from the Internet: <URL: https://images.autodesk.com/adsk/files/3dsmax_2010_special_effects.pdf > (Year: 2010).*

Tencent Technology, WO, PCT/CN2022/118750, Nov. 29, 2022, 4 pgs.

Tencent Technology, ISR, PCT/CN2022/118750, Nov. 29, 2022, 2 pgs.

Shun-ling Wang et al., "Real-Time Simulation of Snowfall in Virtual Scene", Computer Technology and Development, vol. 16, No. 3, Mar. 2006, 4 pgs.

Xiao Miaomiao et al., "Fluid Simulation of SPH Based on OpenCL", Journal of System Simulation, vol. 27, No. 4, Apr. 2015, 7 pgs.

Zhan Yongsong et al., "Study of Special Effect Simulation by Particle System Editor", 2011 IEEE $2^{nd}$ International Conference on Computing, Control and Industrial Engineering, Aug. 21, 2011, 3 pgs.

* cited by examiner

| | |
|---|---|
| Set PhysionScenario | |
| System attribute | Scene manager |
| ∨ Scene manager | |
| Frame rate | 30 |
| Rollover rate | 0.0 |
| Scene stability | 1.0 |
| XXX XXXX XXXXXXXXXXX | 1.0 |
| XXX XXXX XXXXXXXXXXX | 1.0 |
| XXX XXXX XXXXXXXXXXX | 1.0 |
| XXX XXXX XXXXXXXXXXX | ✓ |
| XXXXXXXXX | 2 |

FIG. 3

| | |
|---|---|
| ⌕ | |
| ∨ ○ Set PhysionGeometry | ⊕ 🗑 ☑ |

| | | | |
|---|---|---|---|
| ∨ Emitter Attribute | | Geometry manager | ✎ |
| ∨ Geometry manager | | | |
| Density | 1.0 | | ↶ |
| Material | Common ∨ | | ↶ |
| Material model | Snow ∨ | | |
| Hardness | 0.9 | | |
| XXXXXX XXXXXXXX | 500000.0 | | ↶ |
| XXXXXX XXXXXXXX | 0.3 | | |
| XXXXXX XXXXXXXX | 0.95 | | |
| XXXXXXXXX | 0.4 | | ↶ |
| XXXXXXXXX | 0.8 | | ↶ |
| XXXXXXXXX | 5.0 | | ↶ |
| XXXX XXXXX | ☑ | | ↶ |
| XXX XXX XXXXXXXXX | 0.99 | | |

FIG. 4

| | | |
|---|---|---|
| ⌄ Ground | | |
| Source | ( Plane ⌄ ) 🔍 🖋 | ↶ |
| XXXXXXX | ( 5000.0 ) | ↶ |
| XXXXXXXXX | ( 0.0 ) | |
| ⌄ Skeletal animation | | |
| XXXXXXXXX | ( 100 ) | ↶ |
| Source | ( Reptile ⌄ ) 🔍 🖋 | ↶ |
| XXXXXXX | ( 5000.0 ) | ↶ |
| XXXXXXXXX | ( 0.0 ) | |
| ⌄ Static object | | |
| XXXXXXXXX | ( 50 ) | |
| Source | ( None ⌄ ) 🔍 🖋 | |
| XXXXXXX | ( 0.0 ) | |
| XXXXXXXXX | ( 0.0 ) | |

PHYSICAL SPECIAL EFFECT RENDERING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/118750, entitled "VIRTUAL OBJECT CONTROL METHOD AND APPARATUS, TERMINAL, STORAGE MEDIUM, AND PROGRAM PRODUCT" filed on Sep. 14, 2022, which claims priority to Chinese Patent Application No. 202111237498.X, entitled "PHYSICAL SPECIAL EFFECT RENDERING METHOD AND APPARATUS, COMPUTER DEVICE, AND STORAGE MEDIUM" filed with the Chinese Patent Office on Oct. 25, 2021, all of which are incorporated by reference in their entirety.

FIELD OF THE TECHNOLOGY

This application relates to the field of computer technologies, and in particular, to a physical special effect rendering method and apparatus, a computer device, a storage medium, and a computer program product.

BACKGROUND OF THE DISCLOSURE

With the development of computer technology, the particle emission plug-in is more and more widely used in the development of games and animations. The particle emission plug-in can emit particles in a three dimensional space, and can render the emitted particles for physical special effects.

In traditional technology, the particle emission plug-in cannot conduct physical simulation of particle motion, so it needs to obtain preexisting simulation results obtained from other sources to cooperate with the realization of physical special effects rendering, rendering low efficiency of the particle emission plug-in in physical special effect rendering.

SUMMARY

Embodiments of this application provide a physical special effect rendering method and apparatus, a computer device, a storage medium, and a computer program product.

A physical special effect rendering method is executed by a computer device, and includes: obtaining physical special effect data of physical special effect particles emitted by a particle emission plug-in in a previous frame; obtaining a first target instance obtained by instantiating a scene management class; invoking, through the first target instance, a scene manager of a particle simulation tool to calculate motion state information of the physical special effect particles in a current frame based on the physical special effect data in the previous frame; and updating the physical special effect data in the previous frame based on the motion state information of the current frame to render a physical special effect in the current frame.

A computer device includes a memory and a processor. The memory stores computer-readable instructions, and the computer-readable instructions, when executed by the processor, cause the computer device to perform the steps of the physical special effect rendering method.

One or more non-transitory computer-readable storage media storing computer-readable instructions are provided, the computer-readable instructions, when executed by one or more processors of a computer device, causing the computer device to perform the steps of the physical special effect rendering method.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application or the conventional technology more clearly, the following briefly describes the accompanying drawings required for describing the embodiments or the conventional technology. Apparently, the accompanying drawings in the following descriptions show merely embodiments of this application, and a person of ordinary skill in the art may still derive other drawings from the disclosed accompanying drawings without creative efforts.

FIG. 3 is a schematic diagram of a configuration interface when setting an attribute parameter of a first attribute in an embodiment.

FIG. 4 is a schematic diagram of a configuration interface when setting an attribute parameter of a second attribute in an embodiment.

FIG. 5 is a schematic diagram of a configuration interface when setting an attribute parameter of a third attribute in an embodiment.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 1:
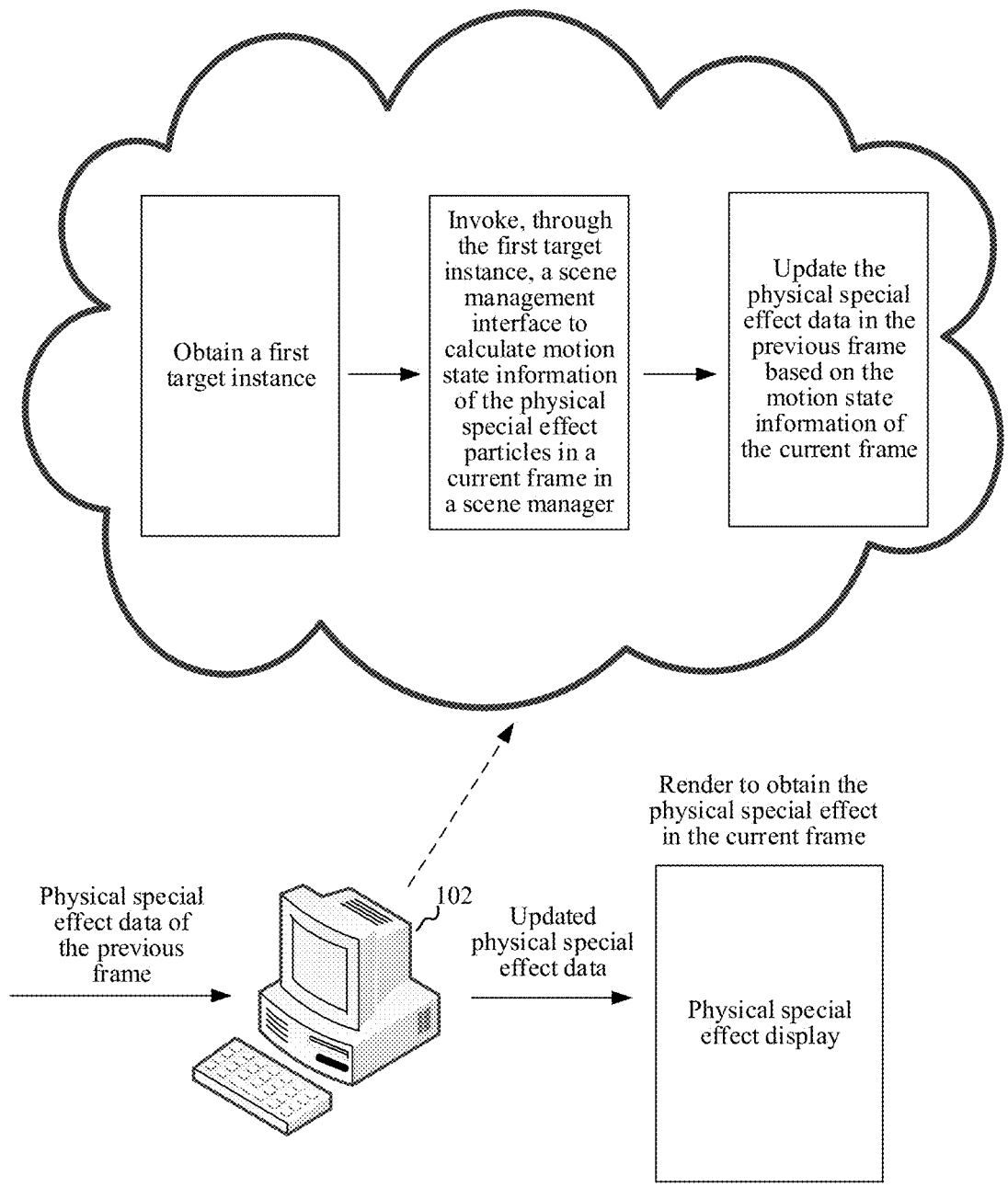
FIG. 1 is an application environment diagram of a physical special effect rendering method in an embodiment.

A physical special effect rendering method provided by this application may be applied to an application environment shown in FIG. 1. The computer device 102 may be a terminal or a server. The terminal includes, but not limited to, various personal computer, notebook computer, smartphone, tablet computer, and portable wearable device; the server may be an independent server or a server cluster consisting of a plurality of servers. The computer device 102 is installed with the particle emission plug-in. The computer device can obtain the physical special effect data of the physical special effect particles emitted by the particle emission plug-in in the previous frame, and further obtain the first target instance obtained by instantiating the scene management class, where the scene management class inherits from the target base class provided by the particle emission plug-in; and then invoke the scene management interface of the particle simulation tool integrated in the particle emission plug-in through the first target instance, so as to, in the scene manager of the particle simulation tool, calculate the motion state information of the physical special effect particles in the current frame based on the physical special effect data in the previous frame, and update the physical special effect data in the previous frame based on the motion state information of the current frame. According to the updated physical special effect data, the computer device 102 can render to obtain the physical special effect in the current frame, and display the rendered physical special effect on the interface of the computer device.

Figure 2:
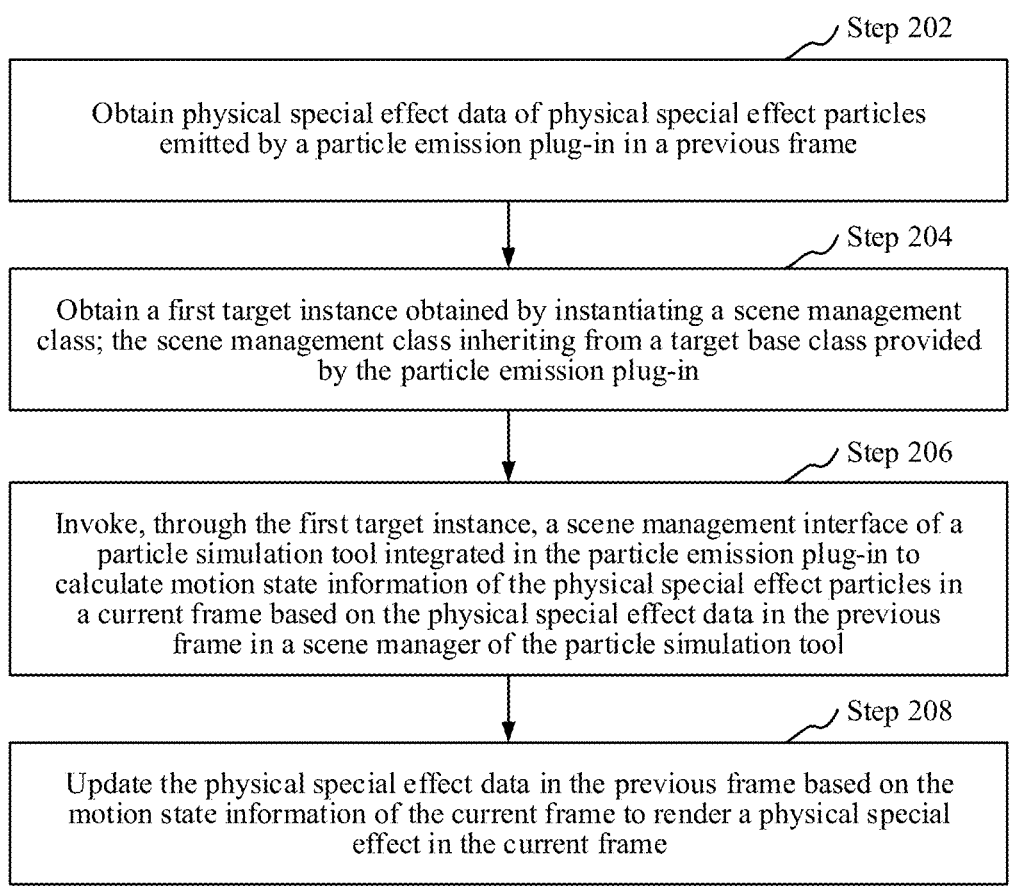
FIG. 2 is a schematic flowchart of a physical special effect rendering method in an embodiment.

In an embodiment, as shown in FIG. 2, a physical special effect rendering method is provided. Taking applying the method to the computer device in FIG. 1 as an example for explanation, it includes the following steps:

Step 202: Obtain physical special effect data of physical special effect particles emitted by a particle emission plug-in in a previous frame.

The particle emission plug-in refers to a plug-in that can simulate emission of physical special effect particles. The particle emission plug-in can be, for example, Niagara plug-in in an Unreal Engine (UE), which also integrates the particle simulation tool at the same time to simulate the physical special effect. The physical special effect can be an effect formed by physical processes expressed in animation. For example, physical processes may be processes that can be simulated using computer animation including the blowing of wind, the swaying of leaves, and the splashing of debris caused by an explosion of objects that people can feel in the physical world. The animation includes, but not limited to, game animation or movie animation. The use of physical special effect can bring more real game feelings, make the animation look more real and more shocking, to achieve the feeling of being personally on the scene. The physical special effect particle refers to a small block of substance that can no longer be divided in the simulation of physical special effects, such as the snow particle, sand particle, oil particle, and water particle, and more widely, such as a small section of hair, and a small piece of cloth, which is also collectively referred to as a particle. The physical special effect data refers to the data related to particles generated in the process of physical special effect simulation. The physical special effect data at least includes the attribute information and motion state information of the physical special effect particles, where the attribute information of the physical special effect particles can include the mass, particle number, life cycle, and other basic information of the physical special effect particles. The motion state information can refer to the state information during the physically specific particle motion.

In an embodiment, the physical special effect data also includes a force value of the physical special effect particle; the force value is used for representing the size of force of the physical special effect particle. The representing of the force of the physical special effect particle can refer to all possible forces on the physical special effect particle, such as the action force, friction force, and gravity exerted on the physical special effect particle by other physical special effect particles.

Specifically, the computer device may read physical special effect data of physical special effect particles emitted by a particle emission plug-in in a previous frame from a video memory allocated to the particle emission plug-in.

It is understandable that the physical special effect particles emitted by the particle emission plug-in have a life cycle. In different animation frames, the particles will die out with the end of the life cycle of the particles. Therefore, when the computer device obtains the physical special effect data, it obtains the corresponding physical special effect data of the currently living particles.

It is also understandable that when the previous frame is the first frame, the physical special effect data in the previous frame is obtained by initializing with a value set by the user. Moreover, when the previous frame is a middle frame, the physical special effect data in the previous frame is obtained by updating the physical special effect data in the previous frame.

Step 204: Obtain a first target instance obtained by instantiating a scene management class. The scene management class inheriting from a target base class provided by the particle emission plug-in.

The target base class is a base class for defining the data interface in the set of base classes provided by the particle emission plug-in. The target base class is an abstract data interface class, which includes an abstract method for invoking the particle simulation tool. The target base class can be used as a parent class to derive multiple subclasses. Each subclass, when implementing the data interface defined by the target base class, invokes the specific data interface of the particle simulation tool by rewriting the abstract method in the data interface. The scene management class inherits from the target base class, i.e., the scene management class is a sub-class derived from the target base class; the scene management class invokes the scene management interface of the particle simulation tool by implementing the data interface defined by the target base class. The particle simulation tool refers to a program module that can implement particle simulation; the particle simulation tool can solve the motion state information of the particles during the simulation process. The first target instance is obtained by instantiating the scene management class, which can realize invoking of the scene management interface of the particle simulation tool by the method of the scene management class.

In an embodiment, the particle simulation tool can be a physion tool. An algorithm used by Physion is a Material Point Method (MPM), which can simulate a variety of different physical materials, such as snow, smoke, water, oil, muscle, and hair under a unified algorithm framework.

At the same time, Physion implements MPM all using a Compute Unified Device Architecture (CUDA) line and performs parallel computing on a Graphics Processing Unit (GPU), which greatly improves the solving efficiency.

Specifically, the computer device can obtain the first target instance in the particle emission plug-in; the first target instance is generated after instantiating the scene management class in the production process of physical special effects. By instantiating the scene management class in the particle emission plug-in, the scene management interface of the particle simulation tool can be invoked in the running process of the particle emission plug-in, to realize the simulation solving of the physical special effect particles.

In an embodiment, the first target instance is generated through the following steps: first determining a base class used for invoking a data interface provided by the particle simulation tool from a set of base classes provided by the particle emission plug-in, to obtain the target base class; then creating the scene management class inheriting from the target base class; and finally instantiating the scene management class to obtain the first target instance.

Step 206: Invoke, through the first target instance, a scene management interface of a particle simulation tool integrated in the particle emission plug-in to calculate motion state information of the physical special effect particles in a current frame based on the physical special effect data in the previous frame in a scene manager of the particle simulation tool.

The particle simulation tool being integrated into the particle emission plug-in means that the Dynamic Link Library (dll) and the static data connection library (library, lib) files obtained by compiling the underlying library corresponding to the particle simulation tool and all header files are integrated into the particle emission plug-in. Thus, the function of the particle simulation tool can be directly invoked in the particle emission plug-in. The scene management interface refers to a data interface corresponding to the scene manager of the particle simulation tool; the scene manager can be invoked through the scene management interface. The scene manager is used for managing the physical special effect scene in the particle simulation tool, so as to realize the simulation solving of the physical special effects of the particle in the scene.

Specifically, after obtaining the first target instance, the computer device may invoke, through the first target instance, a scene management interface of a particle simulation tool integrated in the particle emission plug-in to calculate motion state information of the physical special effect particles in a current frame in a scene manager of the particle simulation tool, and calculation can be conducted during the calculation process based on the physical special effect data in the previous frame.

In one embodiment, the computer device in the scene manager of the particle simulation tool calculates the motion state information of the physical special effect particles in the current frame based on the physical special effect data in the previous frame, and specifically, the Material Point Method (MPM) can be used for calculation, where the MPM is a new calculation method combining the Euler method and Lagrange method. It not only avoids the difficult problem that the Euler method requires to solve the convection term, but also solves the grid distortion and negative volume problems when the Lagrange method deals with the large deformation. In the MPM, the particles exist in a set of background grid as simulation objects. At the beginning of each frame simulation, the current motion state information of the particles is mapped to the background grid, and grid nodes in the background grid are used for solving. After the solving is completed, all information is transferred back to the particles, and then the current motion state information of the particles is updated.

In one embodiment, when the computer device calculates the motion state information of the physical special effect particles in the current frame based on the physical special effect data in the previous frame, the calculation of the current frame can be divided into several time steps. In the first time step, the motion state information of the physical special effect particles in the current time step is calculated based on the physical special effect data in the previous frame. The motion state information of the physical special effect particles in the current time step is iteratively calculated based on the motion state information of the physical special effect particles in the previous time step in each time step thereafter until the calculation of the last time step is completed; the motion state information of the physical special effect particles in the last time step is taken as the motion state information of the physical special effect particles in the current frame. The time step refers to the minimum time unit when calculating the motion state information of the physical special effect particles in the current frame. A time difference between the end time of the current time step and the end time of the previous time step is a step length of the current time step. The step length of the time step can be set in advance as required. For example, the time interval between the previous frame and the current frame is t1, t1 can be evenly divided into 30 time steps. The length of each time step is t1/30.

Step 208: Update the physical special effect data in the previous frame based on the motion state information of the current frame to render a physical special effect in the current frame.

The physical special effect data in the previous frame includes motion state information of the physical special effect particles in the previous frame. The physical special effect in the current frame refers to a physical special effect formed by simulation by the physical special effect particles in the current frame.

Specifically, the computer device replaces the motion state information in the current frame with the motion state information in the physical special effect data in the previous frame to update the physical special effect data in the previous frame to obtain the updated physical special effect data. Based on the updated physical special effect data, the physical special effect in the current frame can be rendered. The computer device can further display the rendered physical special effect in the current frame to complete the simulation of the physical special effect.

In one embodiment, updating the physical special effect data also includes updating the life state of the physical special effect particle in the physical special effect data, canceling the dead particles, updating the force condition of the living particles, and so on.

In one embodiment, during the rendering process, the computer device may render the physical special effect particles with texture-mapped quadrangular sprite. In some low resolution or limited processing power situations, the particles may only be rendered as a pixel, or even as a sphere in offline rendering. A very good liquid surface can be obtained from isosurface calculated from the particle sphere. In addition, three-dimensional grids can be used for rendering the particles. In a specific application, when the particle emission plug-in is the Niagara plug-in, four particle renderers can be provided, respectively using Sprite, Mesh, Ribbon, and Light to render particles.

In the physical special effect rendering method, the physical special effect data of physical special effect particles emitted by a particle emission plug-in in a previous frame is obtained, to obtain the first target instance obtained by instantiating the scene management class. The scene management class inherits from the target base class provided by the particle emission plug-in; and invoke the scene management interface of the particle simulation tool integrated in the particle emission plug-in through the first target instance, so as to, in the scene manager of the particle simulation tool, calculate the motion state information of the physical special effect particles in the current frame based on the physical special effect data in the previous frame, and update the physical special effect data in the previous frame based on the motion state information of the current frame to render to obtain the physical special effect in the current frame. Since the particle simulation tool is integrated in the particle emission plug-in, through the first target instance obtained by instantiating the scene management class, the scene management interface of the particle simulation tool can be invoked, to calculate in the scene manager of the particle simulation tool to obtain the motion state information, so as to render to obtain the physical special effect, avoid obtaining the simulation result externally, and improve the efficiency during physical special effect rendering.

Furthermore, since the particle simulation tool is integrated into the particle emission plug-in, the particle physical simulation can be carried out in real time in the animation frame, and the objects in the scene can be interacted with, which improves the accuracy of the physical special effect simulation and makes the rendered physical special effect more accurate and realistic.

In an embodiment, the first target instance is generated through the following steps: determining a base class used for invoking a data interface provided by the particle simulation tool from a set of base classes provided by the particle emission plug-in, to obtain the target base class; creating the scene management class inheriting from the target base class to invoke the scene management interface of the particle simulation tool; instantiating the scene management class to obtain a first target instance.

The set of base classes includes at least one base class; the base class refers to the class from which a sub-class can be derived. The base class used for invoking the data interface provided by the particle simulation tool refers to that the base class can be used as a parent class to derive subclasses that invoke the data interface provided by the particle simulation tool. When the data interface provided by the particle simulation tool is invoked, various functions of the particle simulation tool can be accessed. The particle simulation tool can provide multiple data interfaces. When different data interfaces are invoked, different functions of the particle simulation tool are accessed. For example, by invoking the scene management interface provided by the particle simulation tool, the scene manager in the particle simulation tool is accessed.

In a specific embodiment, when the particle emission plug-in is the Niagara plug-in and the particle simulation tool is Physion, the target base class may be, for example, NiagaraDataInterface. The member functions contained in the target base class can be shown in Table 1. The member function "IsPhysionDataInterface( )" can be defined in the target base class to implement additions to the Physion related interface. PostInitProperties( ) is used for initializing variables. GetFunctions is used for registering customized functions in NiagaraDataInterface, GetVMExternalFunctio is used for returning a representative of a registered function, and CanExecuteOnTarget is used for setting particle simulation to run on the GPU.

TABLE 1

+IsPhysionDataInterface( );bool
+PostInitProperties( );void
+GetFunctions(out TArray& OutFunctions);void
+GetVMExternalFunction(const FVMExternalFunctionBinding
Info&BindingInfo,void*
InstanceData,FVMExternalFunction&OutFunc);void TABLE 1-continued +CanExecuteOnTarget(EniagaraSinTarget Target);bool Specifically, before the running process of the animation starts, the computer device can determine the base class used for invoking the data interface provided by the particle emission plug-in from the set of base classes provided by the particle emission plug-in, to obtain the target base class, to further create a subclass inheriting from the target base class. In this subclass, invoking of the scene management interface of particle simulation tool is added to rewrite the abstract method in the target base class to obtain the scene management class. Finally, the scene management class is instantiated to the particle emission plug-in, and the first target instance is obtained in the particle emission plug-in. In this way, the first target instance can be obtained in the process of physical special effect rendering by the particle emission plug-in, to invoke the scene management interface of the particle simulation tool to realize the solving of particle motion state information.

In the embodiment above, since the particle emission plug-in provides a base class that can invoke the data interface provided by the particle simulation tool, the scene management class can be extended and obtained through the base class, and then the scene management class is instantiated in the particle emission plug-in to realize the invoking of the scene manager, so that the particle simulation tool can be better integrated in the particle emission plug-in.

In an embodiment, the instantiating the scene management class to obtain a first target instance includes: creating an object corresponding to the scene management class to obtain a scene management object; packaging the scene management object to obtain a first target object; configuring the first target object as a first attribute of the particle emission plug-in to obtain the first target instance.

The object is abstracted from the class and the object can manipulate basic attributes and methods of the class to solve corresponding problems. Packaging means hiding the attribute and implementation details of the object and externally providing only a public access mode. Through packaging, changes can be isolated to facilitate usage, improve reusability, and improve security. The principle of packaging is to hide all the content that does not need to be provided externally, hide all the attributes, and provide public methods to access them.

Specifically, the computer device can create the object corresponding to the scene management class through a "new" operator to obtain the scene management object, then package the code of the scene management object in a preset packaging mode to obtain the first target object, and finally, configure the first target object as the first attribute of the particle emission plug-in, so as to realize the instantiation of the scene management class in the particle emission plug-in. In an embodiment, the preset packaging mode may be, for example, privatizing the attribute, setting public get and set methods, setting parameterless and parameter functions, and finally rewriting the tostring method. The "new" operator is used for creating the operator of the object, and the syntactic structure thereof is: new constructor ( ), where constructor refers to the class corresponding to the object to be created, for example, the creating object corresponding to the scene management class can be new NiagaraDataInterfaceScenario ( ).

In an embodiment, when the particle emission plug-in is the Niagara plug-in, it include a system manager and an emitter manager, and the computer device can configure the scene management classes to be the Niagara's system attribute.

In the embodiment above, since the created scene management object is packaged and configured as the attribute of the particle emission plug-in, the first target instance is obtained. Through the configuration interface, the scene management function of the particle simulation tool can be invoked to generate animation, which improves the security and availability of the first target instance.

In an embodiment, after configuring the first target object as a first attribute of the particle emission plug-in to obtain the first target instance, the method further includes: obtaining a first attribute value by configuring an attribute parameter of the first attribute through a configuration interface of the particle emission plug-in; using the first attribute value as a variable value corresponding to the first target instance; configuring a parameter of the scene manager corresponding to the scene management interface through the variable value corresponding to the first target instance, to obtain a configured scene manager for scene management in the particle simulation tool.

The configuration interface of particle emission plug-in refers to the interface provided by the particle emission plug-in that can configure the attribute parameters of each attribute of the particle emission plug-in. Through this interface, various functions packaged in the particle simulation tool can be invoked. The value of the variable corresponding to the first target instance refers to the specific value of the member variable in the first target instance. The attribute parameters of the first attribute refer to the values of parameters related to the scene, such as scene stability and frame rate.

Specifically, when configuring the attribute parameter of the first attribute through the configuration interface of the particle emission plug-in, the computer device can obtain the attribute value of each attribute parameter configured through the configuration interface, assign the corresponding member variable in the first target instance through the first attribute value, and obtain the variable value corresponding to the first target instance. The variable value corresponding to the first target instance is transmitted into the scene management interface to configure the scene manager corresponding to the scene management interface to obtain the configured scene manager; the scene manager is used for scene management in the particle simulation tool, including the calculation of physical special effect data in the scene combined with the configured attribute value. That is, the motion state information in the current frame is calculated based on the physical special effect data of the physical special effect particles in the previous frame.

For example, FIG. 3 relates to, in an embodiment, a configuration interface provided by the particle emission plug-in for configuring the first attribute. Referring to FIG. 3, the first attribute corresponds to the scene manager; each attribute parameter of the first attribute can be configured at the configuration interface of the particle emission plug-in, such as the frame rate, rollover rate, and stability in FIG. 3.

In the embodiment above, since the value of the first attribute obtained by configuring the attribute parameters of the first attribute can be obtained through the configuration interface of particle emission plug-in, the parameters of the scene manager corresponding to the scene management interface can be configured only through simple configuration operations on the configuration interface to obtain the configured scene manager for scene management in the particle simulation tool. The operation is simple and convenient. Since an underlying configuration process is not needed to know, the configuration efficiency is improved.

In an embodiment, the updating the physical special effect data in the previous frame based on the motion state information of the current frame to render a physical special effect in the current frame includes: obtaining a second target instance obtained by instantiating a geometry management class; the geometry management class inheriting from a target base class provided by the particle emission plug-in; invoking a geometry management interface of the particle simulation tool through the second target instance to write the motion state information of the current frame into a target video memory through a geometry manager in the particle simulation tool, and updating the physical special effect data in the previous frame in the target video memory based on the motion state information of the current frame, to render a physical special effect in the current frame.

The geometry management class is a sub-class inheriting the target base class; the geometry management class invokes the geometry management interface of the particle simulation tool by implementing the data interface defined by the target base class. The geometry management interface refers to a data interface provided by the geometry manager of the particle simulation tool; the geometry manager can be invoked through the geometry management interface. The geometry manager is used for managing the attributes of the object in the physical special effect in the particle simulation tool, including physical attributes and physical special effect data of particles constituting the object, where the physical attribute is, for example, the object material, density, brittleness, etc. The second target instance is obtained by instantiating the geometry management class. Then the geometry management interface of the geometry manager can be invoked through the second target instance by implementing the method of the geometry management class. The target video memory refers to the data buffer region allocated for the rendering data of the particle emission plug-in.

Specifically, since the motion state information of the current frame is calculated in the particle simulation tool, the obtained motion state information is stored in the data buffer region different from the target video memory, and the geometry manager can manage the physical special effect data of the particles, so the motion state information can be written into the target video memory by means of the geometry manager. Specifically, when the computer device updates the physical special effect data in the previous frame based on the motion state information of the current frame to render the physical special effect in the current frame, it can obtain the second target instance obtained by instantiating the geometry management class and invoke the geometry management interface of the particle simulation tool through the second target instance. Thus, the motion state information of the current frame is written into the target video memory through the geometry manager corresponding to the geometry management interface; the physical special effect data of the previous frame is stored in the target video memory. After the motion state information of the current frame is written into the target video memory through the geometry manager, the physical special effect data corresponding to the previous frame in the target video memory can be updated to obtain the updated physical special effect data; the updated physical special effect data can be used for rendering the physical special effect in the current frame.

In the embodiment above, invoking a geometry management interface of the particle simulation tool through the second target instance to write the motion state information of the current frame into a target video memory through a geometry manager in the particle simulation tool, can rapidly obtain the data to be rendered in the particle simulation tool, improving the rendering efficiency.

In an embodiment, the second target instance is generated through the following steps: creating a geometry management class inheriting from the target base class to invoke the geometry management interface of the particle simulation tool; creating an object corresponding to the geometry management class to obtain a geometry management object; packaging the geometry management object to obtain a second target object; configuring the second target object as a second attribute of the particle emission plug-in to obtain the second target instance.

Specifically, before the running process of the animation starts, the computer device can determine the base class used for invoking the data interface provided by the particle emission plug-in from the set of base classes provided by the particle emission plug-in, to obtain the target base class, to further create a subclass inheriting from the target base class. In this subclass, invoking of the geometry management interface of the particle simulation tool is added to rewrite the abstract method in the target base class to obtain the geometry management class. Finally, the geometry management class is instantiated to the particle emission plug-in, and the second target instance is obtained in the particle emission plug-in. In this way, the second target instance can be obtained in the process of physical special effect rendering by the particle emission plug-in, to invoke the geometry management interface of the particle simulation tool to realize the management of the attribute of the object in the physical special effect.

During the instantiation process, the computer device can create the object corresponding to the geometry management class through a "new" operator to obtain the geometry management object, then package the code of the geometry management object in a preset packaging mode to obtain the second target object, and finally, configure the second target object as the second attribute of the particle emission plug-in, so as to realize the instantiation of the geometry management class in the particle emission plug-in.

In an embodiment, when the particle emission plug-in is the Niagara plug-in, it include a system manager and an emitter manager, and the computer device can configure the geometry management classes to be the Niagara's emitter attribute.

In the embodiment above, since the particle emission plug-in provides a base class that can invoke the data interface provided by the particle simulation tool, the geometry management class can be extended and obtained through the base class, and then the geometry management class is instantiated in the particle emission plug-in to realize the invoking of the geometry manager, so that the particle simulation tool can be better integrated in the particle emission plug-in. In addition, the created geometry management object is packaged and configured as the attributes of the particle emission plug-in to obtain the second target instance, so that an artist can directly invoke the geometry management function of the particle simulation tool through the configuration interface to make animation without the assistance of a programmer, which improves the security and usability of the second target instance.

In an embodiment, after configuring the second target object as a second attribute of the particle emission plug-in to obtain the second target instance, the method further includes: obtaining a second attribute value by configuring an attribute parameter of the second attribute through a configuration interface of the particle emission plug-in; using the second attribute value as a variable value corresponding to the second target instance; configuring a geometry manager corresponding to the geometry management interface through the variable value corresponding to the second target instance, to obtain a configured geometry manager for geometry management in the particle simulation tool.

The configuration interface of particle emission plug-in refers to the interface provided by the particle emission plug-in that can configure the attribute parameters of each attribute of the particle emission plug-in. Through this interface, various functions of the particle simulation tool can be packaged and invoked. The value of the variable corresponding to the second target instance refers to the specific value of the member variable in the second target instance. The attribute parameters of the second attribute refer to the values of parameters related to the attribute of the object in the physical special effect, such as object material and density.

Specifically, when configuring the attribute parameter of the second attribute through the configuration interface of the particle emission plug-in, the computer device can obtain the attribute value of each attribute parameter configured through the configuration interface, assign the corresponding member variable in the second target instance through the second attribute value, and obtain the variable value corresponding to the second target instance. The variable value corresponding to the second target instance is transmitted into the geometry management interface to configure the geometry manager corresponding to the geometry management interface to obtain the configured geometry manager; the geometry manager is used for management of the attribute of the object in the physical special effect in the particle simulation tool.

For example, FIG. 4 relates to, in an embodiment, a configuration interface for the particle emission plug-in to configure the second attribute. Referring to FIG. 4, the second attribute corresponds to the geometry manager; each attribute parameter of the second attribute can be configured at the configuration interface of the particle emission plug-in, such as the density, material, material model, and hardness in FIG. 4.

In the embodiment above, since the value of the second attribute obtained by configuring the attribute parameters of the second attribute can be obtained through the configuration interface of particle emission plug-in, the parameters of the geometry manager corresponding to the geometry management interface can be configured only through simple configuration operations on the configuration interface to obtain the configured geometry manager for geometry management in the particle simulation tool. The operation is simple and convenient. Since an underlying configuration process is not needed to know, the configuration efficiency is improved.

In an embodiment, the method further includes: obtaining a third target instance obtained by instantiating a boundary condition management class; the boundary condition management class inheriting from a target base class provided by the particle emission plug-in; and invoking, through the third target instance, a boundary condition management interface of the particle simulation tool to obtain a target boundary condition in a boundary condition manager of the particle simulation tool; and the calculating motion state information of the physical special effect particles in a current frame based on the physical special effect data in the previous frame in a scene manager of the particle simulation tool includes: calculating the motion state information of the physical special effect particles in the current frame based on the physical special effect data in the previous frame and the target boundary condition in the scene manager of the particle simulation tool.

The boundary condition management class is a sub-class inheriting the target base class; the boundary condition management class invokes the boundary condition management interface of the particle simulation tool by implementing the data interface defined by the target base class. The boundary condition management interface refers to an interface provided by the boundary condition manager of the particle simulation tool; the boundary condition manager can be invoked through the boundary condition management interface. The boundary condition manager is used for managing the boundary condition in the scene in the particle simulation tool. The boundary condition refers to Signed Distance Fields (SDF), and is an object that participates in simulation and can collide with the particles. The boundary condition includes three types: ground, static object, and skeletal animation, where the ground and static object are static, while the skeletal animation is dynamic. Different from particles, the position change of SDF is not solved by dynamics, but only fixed in advance (static) or driven by an FBX model (dynamic). The target boundary condition refers to the boundary condition corresponding to the pre-configured boundary condition parameters. The third target instance is obtained by instantiating the boundary condition management class. Then the boundary condition management interface can be invoked through the third target instance by implementing the method of the boundary condition management class, so as to implement the management of the boundary condition.

Specifically, in the physical special effects that need to simulate collision effects, parameters corresponding to the target boundary conditions can be pre-configured, so that the computer device can obtain the third target instance obtained by instantiating the boundary condition management class during the animation running process. Through the third target instance, the boundary condition management interface of the particle simulation tool can be invoked to obtain the target boundary conditions in the boundary condition manager according to the corresponding parameters of the target boundary conditions. Since the target boundary condition is obtained, when calculating the motion state information of the physical special effect particles in the current frame, the target boundary condition can be registered into the scene manager; in the scene manager, based on the physical special effect data in the previous frame and the target boundary condition, the motion state information of the physical special effect particles in the current frame is calculated. For example, assuming that the target boundary condition is the ground, the source parameter of the boundary condition can be specified as "plane actor" during the configuration, and then the "plane actor" in the scene in the boundary condition manager can be used as the ground.

In the embodiment above, the boundary condition management interface of the particle simulation tool is invoked through the third target instance to obtain the target boundary condition in the boundary condition manager, so that the solving of the collision process can be simulated in the scene manager, so that the physical special effect obtained by simulation can be diversified.

In an embodiment, the third target instance is generated through the following steps: creating a boundary condition management class inheriting from the target base class to invoke the boundary condition management interface of the particle simulation tool; creating a target derived class inheriting from the boundary condition management class and corresponding to a type configuration parameter, and instantiating the target derived class to obtain the third target instance; where the type configuration parameter is a parameter obtained by configuring the type of the boundary condition manager obtained through a configuration interface of the particle emission plug-in.

In the embodiment of this application, when the data interface provided by the particle simulation tool is invoked, various functions of the particle simulation tool can be accessed. The particle simulation tool can provide multiple data interfaces. When different data interfaces are invoked, different functions in the particle simulation tool are accessed. For example, when needing to access the boundary condition manager in the particle simulation tool, it can be implemented by invoking the boundary condition management interface provided by the particle simulation tool. The boundary condition manager is used for managing the boundary condition, including generating the boundary condition that corresponds to the configuration parameter.

The type configuration data is the data for representing the type of the boundary condition manager. Different boundary conditions correspond to different boundary condition managers. For example, the ground boundary condition is managed through the ground boundary condition manager. When multiple different types of boundary condition managers are required, multiple type configuration parameters can be configured to obtain different target derived classes for different type configuration parameters. Taking the particle emission plug-in as Niagara as an example, in the Niagara System, Sdf can only be used as an external input. Therefore, if the user wants to add Sdf as a collider, the corresponding type of NiagaraDataInterfaceSdf needs to be added into the User Exposed. For example, three different types of type configuration parameters can be configured, which respectively are the ground boundary condition (GroudSdf), skeletal animation boundary condition (SkeletalMeshSdf), and static object boundary condition (StaticMeshSdf).

Specifically, before the running process of the animation starts, the computer device can determine the base class used for invoking the data interface provided by the particle emission plug-in from the set of base classes provided by the particle emission plug-in, to obtain the target base class, to further create a subclass inheriting from the target base class. In this subclass, invoking of the boundary condition management interface of the particle simulation tool is added to rewrite the abstract method in the target base class to obtain the boundary condition management class. Since the boundary condition managers have different types, it needs to create the target derived classes corresponding to the type configuration parameter based on the boundary condition management classes. Finally, the target derived class is instantiated to the particle emission plug-in, and the third target instance is obtained in the particle emission plug-in. In this way, the third target instance can be obtained in the process of the physical special effect rendering by the particle emission plug-in, to invoke the boundary condition management interface corresponding to the third instance type in the particle simulation tool to realize the solving of the particle motion state information during collision.

In the embodiment above, since the particle emission plug-in provides a base class that can invoke the data interface provided by the particle simulation tool, the boundary condition management class can be extended and obtained through the base class, and then based on the boundary condition management class, different derived classes can be derived and instantiated in the particle emission plug-in to realize the invoking of the boundary condition managers in different types, so that the particle simulation tool can be better integrated in the particle emission plug-in.

In an embodiment, the instantiating the target derived class to obtain a third target instance includes: creating an object corresponding to the target derived class to obtain a target boundary condition management object; packaging the target boundary condition management object to obtain a third target object; configuring the third target object as a third attribute of the particle emission plug-in to obtain the third target instance.

Specifically, during the instantiation process, the computer device can create the object corresponding to the target derived class through a "new" operator to obtain the target boundary condition management object, then package the code of the target boundary condition management object in a preset packaging mode to obtain the third target object, and finally, configure the third target object as the third attribute of the particle emission plug-in, so as to realize the instantiation of the target derived class in the particle emission plug-in.

In an embodiment, when the particle emission plug-in is the Niagara plug-in, it include a system manager and an emitter manager, and the computer device can configure the target derived classes to be the Niagara's system attribute.

In the embodiment above, since the created target boundary condition management object is packaged and configured as the attribute of the particle emission plug-in, the third target instance is obtained. Therefore, an artist can directly invoke the boundary condition management function of the particle simulation tool through the configuration interface without the assistance of a programmer, which improves the security and usability of the third target instance.

In an embodiment, after configuring the third target object as a third attribute of the particle emission plug-in to obtain the third target instance, the method further includes: obtaining a third attribute value by configuring an attribute parameter of the third attribute through a configuration interface of the particle emission plug-in; using the third attribute value as a variable value corresponding to the third target instance; configuring a parameter of the boundary condition manager corresponding to the boundary condition management interface through the variable value corresponding to the third target instance, to obtain a configured boundary condition manager for boundary condition management in the particle simulation tool.

The attribute parameter of the third attribute refers to the parameter related to the boundary condition in the physical special effect, to specify the object corresponding to the boundary condition.

Specifically, when configuring the attribute parameter of the third attribute through the configuration interface of the particle emission plug-in, the computer device can obtain the attribute value of each attribute parameter configured through the configuration interface, assign the corresponding member variable in the third target instance through the third attribute value, and obtain the variable value corresponding to the third target instance. The variable value corresponding to the third target instance is transmitted into the boundary condition management interface corresponding to the third target instance to configure the boundary condition manager corresponding to the boundary condition management interface to obtain the configured boundary condition manager; the boundary condition manager is used for management of the boundary condition in the particle simulation tool.

It should be noted that, when multiple types of scene managers are pre-configured, for each scene manager, a target derived class that inherits from the boundary condition management class is created, to obtain multiple target derived classes.

For each target derived class, the corresponding object is created to obtain the corresponding target boundary condition management object, and each target boundary condition management object is packaged to obtain multiple third target objects. Each third target object is configured as the third attribute of the particle emission plug-in, so as to obtain multiple third target instances. In order to facilitate the configuration and improve the configuration efficiency, when the third attribute value obtained by configuring the attribute parameters of each third attribute is obtained through the configuration interface of the particle emission plug-in, the obtaining can be conducted through the same configuration interface. For example, FIG. 5 relates to, in an embodiment, a configuration interface for the particle emission plug-in to configure the third attribute. With reference to FIG. 5, the same interface includes parameter configuration items of ground, bone animation, and static object, and the attribute values of three different types of boundary conditions of ground, bone animation, and static object can be obtained through this interface at the same time.

In the embodiment above, since the value of the third attribute obtained by configuring the attribute parameters of the third attribute can be obtained through the configuration interface of particle emission plug-in, the parameters of the boundary condition manager corresponding to the boundary condition management interface can be configured only through simple configuration operations on the configuration interface. The operation is simple and convenient. Since an underlying configuration process is not needed to know, the configuration efficiency is improved.

In an embodiment, the calculating motion state information of the physical special effect particles in a current frame based on the physical special effect data in the previous frame in a scene manager of the particle simulation tool includes: calculating the motion state information of the physical special effect particles in the current frame based on the physical special effect data in the previous frame in the scene manager of the particle simulation tool and writing the motion state information in a first video memory; and the updating the physical special effect data in the previous frame based on the motion state information of the current frame to render a physical special effect in the current frame comprises: reading the motion state information of the current frame from the first video memory and copying the motion state information of the current frame; writing the copied motion state information in a second video memory, and updating the physical special effect data in the previous frame based on the motion state information of the current frame in the second video memory; where the first video memory is a data buffer region allocated to the particle simulation tool in a target video memory of the particle emission plug-in; and the second video memory is a data buffer region different from the first video memory in the target video memory for storing particle emission data and particle rendering data.

In this embodiment, the particle emission plug-in is the Niagara plug-in, and the integrated particle simulation tool in this plug-in is physion. In the GPU Sim mode of Niagara, Niagara uses High Level Shader Language (HLSL) to conduct a GPU Buffer (the data buffer region corresponding to the GPU) operation, and at the same time, Physion uses Compute Unified Device Architecture (Cuda) to conduct the GPU buffer operation. However, HLSL and CUDA cannot invoke each other, and therefore, a CUDA and Compute Shader interoperation mode is adopted in the embodiment of this application to realize indirect interaction.

Specifically, a first video memory can be allocated to physion, and the first video memory uses CUDA for operations; a second video memory is allocated to Niagara, and the second video memory uses Compute Shader for operations. Data in the first video memory and the second video memory can be copied to implement data transfer from GPU to GPU. The first video memory is mainly used for storing particle emission data and particle rendering data. The particle emission data refers to particle attribute data stored by Niagara's particle emitter when emitting particles, and the particle rendering data refers to the physical special effect data of particles stored by Niagara when performing the rendering step.

Since the motion state information in the current frame is solved by the scene manager of the particle simulation tool; the solved motion state information would be written to the first video memory allocated to Physion, and the physical special effect is rendered in Niagara, the computer device can read the motion state information of the current frame from the first video memory. The motion state information of the current frame is copied, and the copied motion state information is written into the second video memory, and the physical special effect data of the previous frame is updated in the second video memory based on the motion state information of the current frame.

In the embodiment above, different video memories are allocated and a mode of data copy is adopted to realize interoperation among different programming languages, so that Physion can be conveniently and quickly integrated into Niagara without a large amount of code modification, which improves the development efficiency.

In an embodiment, the method further includes: emitting a preset number of initial particles at a position of a preset model, and writing attribute information of the initial particles into a second video memory; reading the attribute information of the initial particles from the second video memory and copying the attribute information of the initial particles; writing the copied attribute information of the initial particles into a first video memory, and sampling, through the particle simulation tool, a surface and an interior of the preset model based on the attribute information of the initial particles in the first video memory to obtain physical special effect particles for physical special effect simulation.

Figure 6:
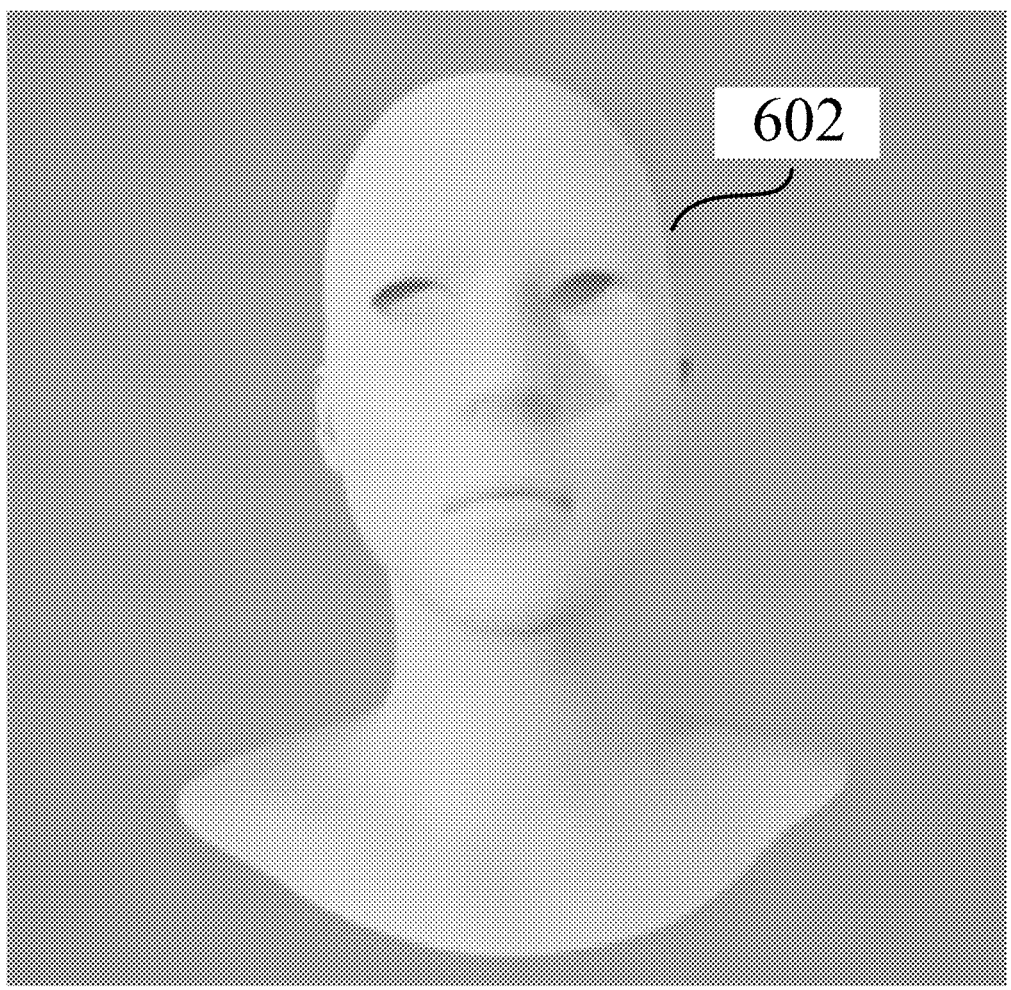
FIG. 6 is a schematic diagram of a preset model in an embodiment.

The preset model is used for controlling the generation position of the particles. The preset model can be regular or irregular geometry, such as the model of a ring, a sphere, and a cone. A preset model may also be a mesh, such as Static Mesh or Skeletal Mesh, as shown in FIG. 6, which is a schematic diagram of a preset model in an embodiment. 602 in FIG. 6 is the preset model.

Figure 7:
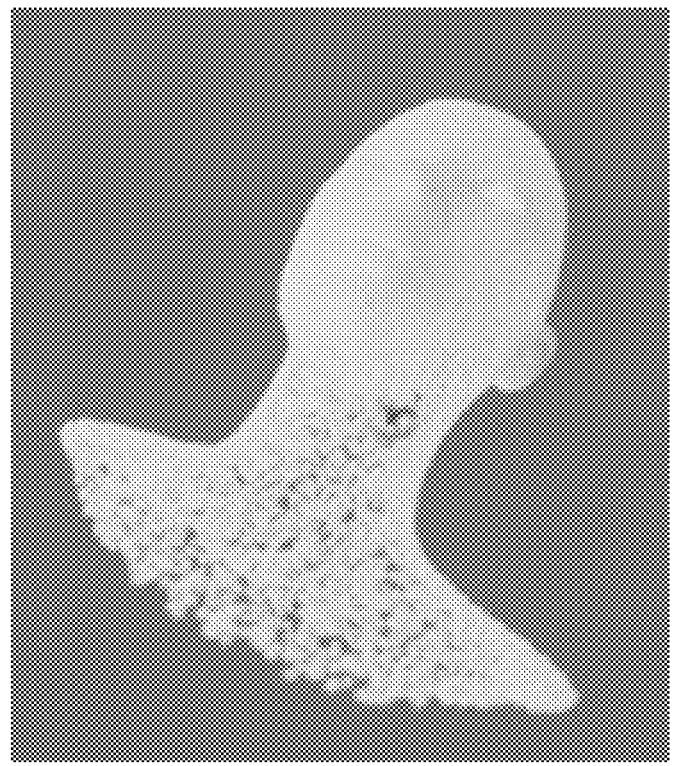
FIG. 7 is a schematic diagram of particles obtained by sampling in an embodiment.
Figure 7:
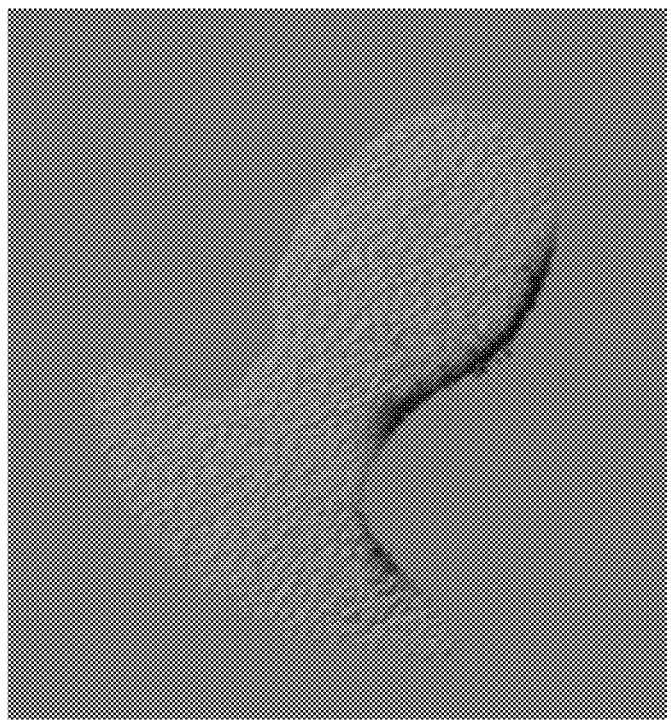

It should be noted that, in traditional technology, Niagara can only sample on the surface of the mesh when generating particles at the mesh. For example, the particles obtained by sampling on the surface of static mesh shown in 602 in FIG. 6 are shown in FIG. 7(a). It can be seen that sampled particles are only on the surface of human heads. However, there is no sampling particle in the interior; such a generation mode may not meet the usage requirements. In actual use, particles may need to be generated in the Mesh. For example, when needing to simulate the effect of breaking a snowball and requiring different physical parameters of different parts of the snowball, a sphere needs to be divided into multiple meshes. Then, each mesh is sampled as a sampling body, and a ball is divided into multiple emitters. Then, different physical parameters are set for each Emitter. On this basis, in the embodiment of this application, the particle sampling function in Physion is accessed, so that particles can be sampled both on the surface and inside of the Mesh. For example, the particles obtained by sampling on the surface and inside of the static mesh shown in 602 in FIG. 6 are shown in FIG. 7(b).

In this embodiment, the Niagara plug-in emits a preset number of initial particles at the position of the preset model, and writes the attribute information of the initial particles into the second video memory, which is allocated to Niagara. Since the particles need to be sampled in Physion, the attribute information of the initial particles needs to be read from the second video memory. The attribute information of the initial particles is copied and written into the first video memory allocated to Physion. Then, physical specific effect particles for physical specific effect simulation are obtained by sampling on the surface and inside of the preset model by Physion.

In the embodiment above, by reading the attribute information of the initial particles from the second video memory, the attribute information of the initial particles are copied; the copied attribute information of the initial particles is written into a first video memory; through the particle simulation tool, a surface and an interior of the preset model are sampled based on the attribute information of the initial particles in the first video memory so that the sampled physical special effect particles better meet the special effect simulation requirements.

In an embodiment, the calculating motion state information of the physical special effect particles in a current frame based on the physical special effect data in the previous frame in a scene manager of the particle simulation tool includes: mapping the physical special effect data in the previous frame to a preset background grid in the scene manager of the particle simulation tool; the preset background grid including a plurality of grid nodes; calculating motion state information of the grid node corresponding to each physical special effect particle in the current frame based on the physical special effect data in the background grid; mapping the motion state information of each grid node to the corresponding physical special effect particle to obtain the motion state information of each physical special effect particle in the current frame.

The background grid refers to the simulation space used for placing the physical special effect particles in the calculation process. The background grid includes at least multiple grid nodes, and multiple refers to at least two. In an embodiment, the background grid may be divided into at least one grid block, each of which includes at least one grid for placing the physical special effects particles, and each grid corresponds to at least one grid node. To reduce memory usage, a data structure can be used for storing grid blocks sparsely, that is, only the grid blocks on which the physical special effect particles fall are allocated with a corresponding internal storage.

Specifically, the computer device can interpolate the physical special effect data of the physical special effect particle in the previous frame into the preset background grid through a form function. For a certain physical special effect particle, the grid node interpolated by the physical special effect data of the physical special effect particle is the corresponding grid node of the physical special effect particle in the background grid. The computer device further calculates the motion state information of the grid nodes in the background grid based on the interpolation information, and then maps the calculated motion state information back to the physical special effect particles corresponding to the grid nodes through the form function, so as to obtain the motion state information of each physical special effect particle in the current frame. Interpolation can refer to interpolation of a continuous function on the basis of discrete data, so that the continuous curve passes through all given discrete data points. Interpolation is an important method of discrete function approximation, which can be used for estimating an approximate value of a function at other points by the value situation of a finite number of points.

Figure 8:
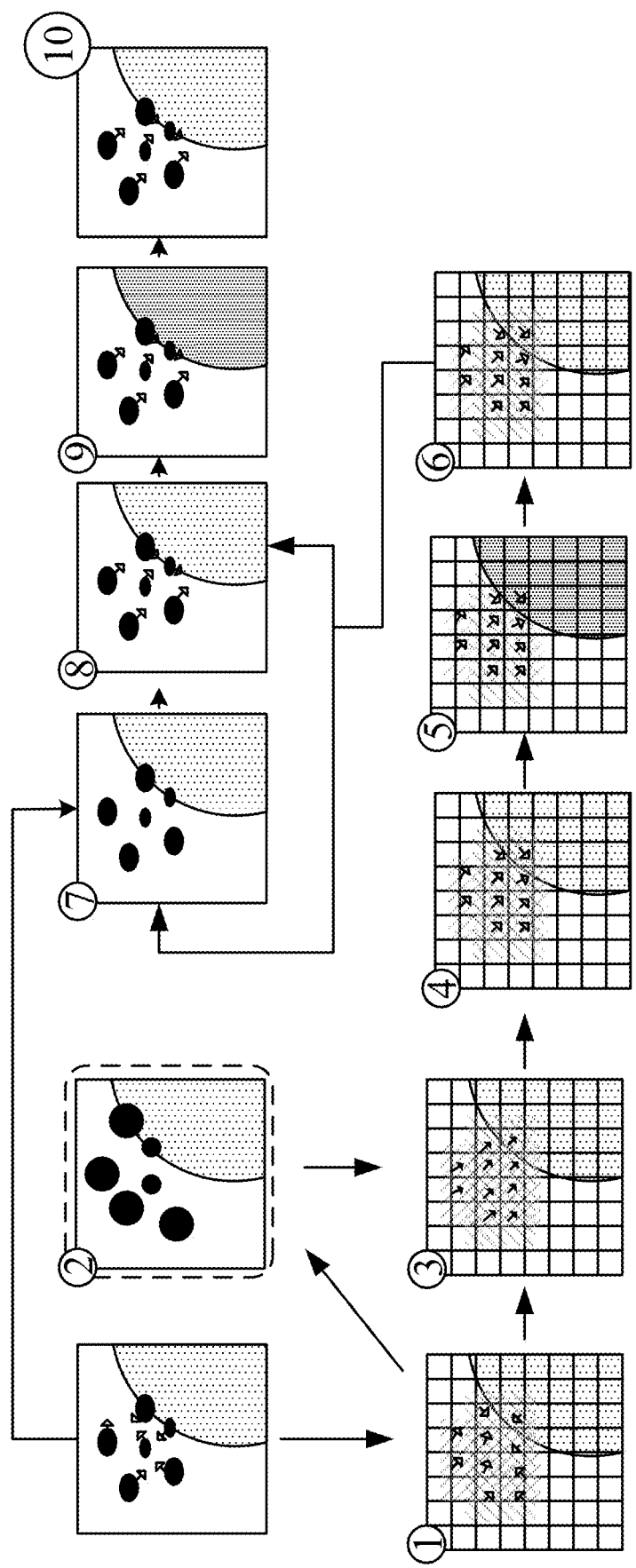
FIG. 8 is a schematic diagram of motion state information calculation in an embodiment.

FIG. 8 is a schematic flowchart of motion state information calculation through a background grid in a specific embodiment. Referring to FIG. 8, the following steps are specifically included:
1. Interpolate the mass and velocity of the physical special particles into the background grid.
2. Calculate the volume of the physical special particles.
3. Calculate a force value of grid nodes according to the calculated volume.
4. Calculate velocity, displacement, and other information of the grid nodes according to the calculated force value.
5. Conduct collision detection between the grid nodes and the boundary condition.
6. After the collision detection, implicitly solve the velocity, displacement, and other information of the grid nodes.
7. Map the obtained information through solving to the corresponding physical special particle to update a deformation gradient of the physical special effect particle.
8. Update the velocity of the physical special effect particle according to the deformation gradient.
9. Conduct collision detection between the particles and the boundary condition.
10. Update the velocity, position, and other motion state information of the physical special effect particle according to a new particle velocity.

As can be seen from the process in FIG. 8, during the simulation, each physical special effect particle stores its own attribute values, such as mass, position, velocity, deformation gradient, and elastoplastic physical parameters, while the grid node needs to calculate the force condition, acceleration condition, velocity increment, the processing of the boundary conditions (i.e., the colliders), etc.

During specific implementation, to ensure the accuracy of calculation, the current frame can be divided into multiple time steps, and each time step calculates the motion state information once. When the cumulative duration of the multiple time steps reaches the duration of the current frame, each new attribute value of the physical special effect particles is output as the result of the current frame.

In the embodiment above, the motion state information of the particles is calculated by mapping the physical special effect data to the background grid. Since the background grid is greatly reduced with respect to the number of the particles, the overhead in the calculation process is saved.

This application also provides an application scene, which applies the physical special effect rendering method, and the rendering of the physical special effect in the game is realized through the physical special effect rendering method. Specifically, in this application scene, the particle emission plug-in is Niagara, and is integrated with the particle simulation tool Physion, where Niagara is a main next generation particle system of UE. Using Niagara, Technical Artist (TA) can create additional functions by themselves without the assistant of the programmer. Niagara has the characteristics of being easily used and easily understandable. With Niagara, the artist may have full control over the effects; it is programmable and customizable, provides better debugging, display and performance tools, supports data of other parts of the UE or external sources, and does not interfere with user operations.

Figure 9:
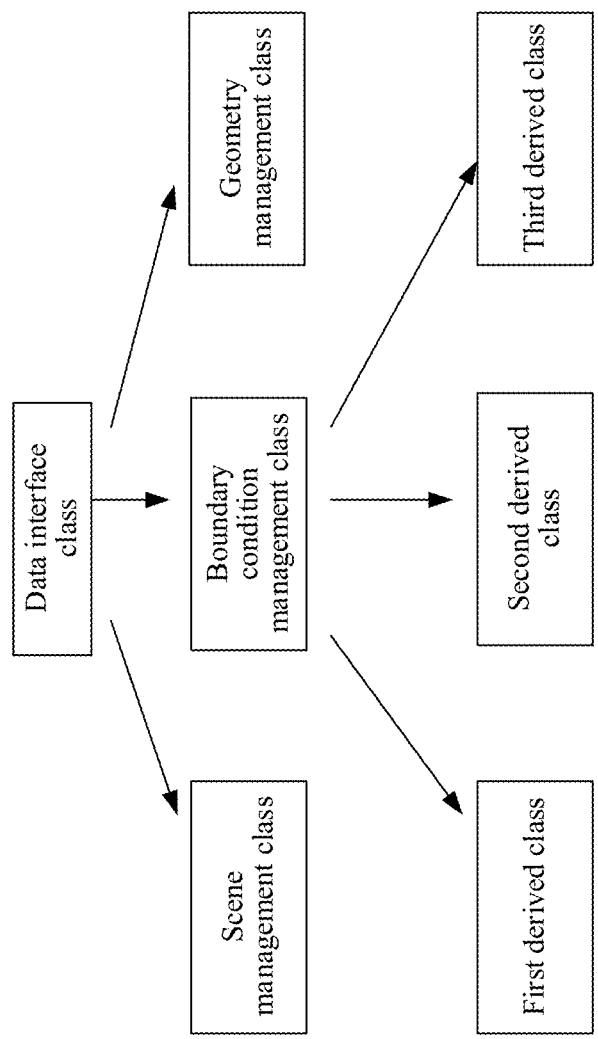
FIG. 9 is a relation diagram of classes provided by a particle emission plug-in in an embodiment.

The particle emission plug-in provided by the embodiment of this application provides multiple classes derived from data interface classes (NiagaraDataInterface). These classes can be accessed in Niagara and are instantiated in Niagara System and Niagara Emitter, so that Physion can be invoked in the running process of Niagara, to further implement the kinetic solving function of particles. FIG. 9 is a class relation diagram of the particle emission plug-in. The class relation diagram includes main classes, where the data interface class (NiagaraDataInterface) is the target base class. By the target base class, the scene management class (NiagaraDataInterfaceScenario), geometry management class (NiagaraDataInterfaceGeometry) and boundary condition management class (NiagaraDataInterfaceSdf), i.e., three subclasses, are derived. From the boundary condition management class (NiagaraDataInterfaceSdf), a first derived class (NiagaraDataInterfaceStaticMeshSdf) corresponding to the static object, a second derived class (NiagaraDataInterfaceSkeletalMeshSdf) corresponding to the skeletal animation, and a third derived class (NiagaraDataInterfaceGroundSdf) corresponding to the ground, i.e., three subclasses, are further derived, which are respectively explained below:

1. NiagaraDataInterfaceScenario

In the particle emission plug-in provided in the embodiment of this application, class NiagaraDataInterfaceScenario corresponds to the Scenario in Physion, i.e., the current simulation scene manager. In Niagara, one Niagara System corresponds to a NiagaraDataInterfaceScenario, i.e., NiagaraDataInterfaceScenario is used as a unique attribute of one Niagara System. All particles in one Niagara System (even belonging to different Emitters) can collide and interact with each other, while the particles in different Niagara systems are isolated from each other and cannot affect each other.

2. NiagaraDataInterfaceGeometry

In the particle emission plug-in provided in the embodiment of this application, class NiagaraDataInterfaceGeometry corresponds to the geometry manager Geometry in Physion; in Niagara, one Niagara Emitter corresponds to one NiagaraDataInterfaceGeometry, i.e., the NiagaraDataInterfaceGeometry is used as an unique attribute of one Niagara Emitter. The particles of the same Emitter are initialized with the same set of parameters. A System can include multiple Emitters, that is, multiple Geometries. At the beginning of simulation, data of each Emitter will be obtained in the initialization stage of Scenario, and the initialization of the System Scenario is completed.

3. NiagaraDataInterfaceSdf

In the particle emission plug-in provided in the embodiment of this application, NiagaraDataInterfaceSdf is used as the base class of the boundary condition, to be derived to subclasses with different uses, including:

1) NiagaraDataInterfaceStaticMeshSdf

This subclass can implement the Actor containing Static Mesh Component in the scene as the input, and Physion samples its Static Mesh, and obtains SDF format data that can participate in collision calculation, and input it into the Scenario, used as the static boundary condition in simulation.

2) NiagaraDataInterfaceSkeletalMeshSdf

This subclass can implement the Actor containing Skeletal Mesh Component in the scene as the input, and Physion samples Skeletal Mesh in the current frame state at each frame, and obtains SDF format data that can participate in collision calculation, and upon comparison with the Static Mesh Sdf, each frame of Skeletal Mesh Sdf needs to be updated and used as the boundary condition in a motion state in simulation.

3) NiagaraDataInterfaceGroundSdf

The boundary condition obtained by this subclass is generally specified in the scene as a Plane Actor; as an infinitely extended plane, particles cannot pass through this plane, and it is generally used as the ground.

In addition, Sdf can only be used as an external input during simulation, and the Actor in the scene is mounted to the Niagara Component in the scene. In the Niagara System, particles can only be compiled, and Sdf cannot be imported to collide with the particles.

Figure 10:
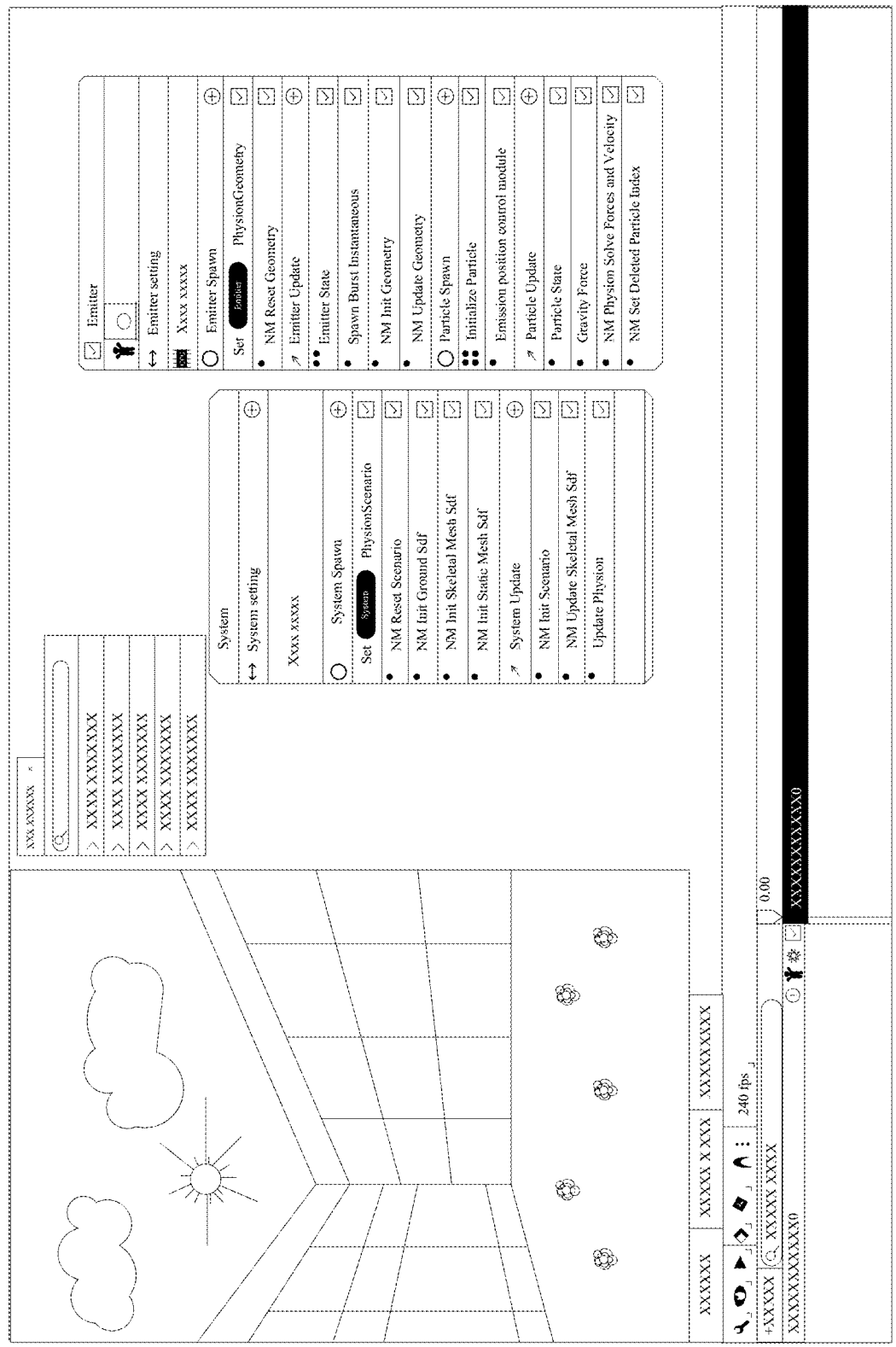
FIG. 10 is a schematic diagram of displaying each module at the configuration interface in an embodiment.

Furthermore, in the application scene, each function of Physion is packaged, and a corresponding addable attribute is added in the configuration interface of Niagara; moreover, by means of invoking the compiled model script in the corresponding configuration interface of the Niagara, the integration of the Niagara to Physion is implemented. FIG. 10 is a schematic diagram of Niagara displaying various modules in the configuration interface, and the drawing of the configuration interface mainly includes NiagaraSystem (system) and NiagaraEmitter (emitter), i.e., two modules. NiagaraSystem is used as the manager of the current system, while NiagaraEmitter is used as one emitter in the current System, where the NiagaraSystem module mainly includes two modules: system spawn and system update. The NiagaraEmitter module mainly includes four modules: emitter spawn, emitter update, particle spawn, and particle update modules. Different modules are used for executing steps in different stages. These modules are introduced respectively as follows.

1. System Spawn: this module includes the following modules:
   1) Set PhysionScenario. In this module, the system attribute PhysionScenario can be set, i.e., an instance of the NiagaraDataInterfaceScenario as the System attribute; the attribute parameter of PhysionScenario can be set in this module, please refer to FIG. 3 for details.
   2) NM Reset Scenario. The function of this module is clearing data of the last simulation when each Niagara circulation starts, and resetting Physion as the initial state to prepare for the next simulation.
   3) NM Init Ground Sdf, NM Init Skeletal Mesh Sdf, and NM Init Static Mesh Sdf: these three modules are used for initializing different types of boundary conditions, respectively. Refer to the descriptions in the embodiment above for details.

It should be noted that, in the Niagara System, Sdf can only be used as an external input, and therefore, if the user wants to add Sdf as a collider, it needs to add the corresponding type of NiagaraDataInterfaceSdf to the User Exposed. After adding NiagaraDataInterfaceSdf to the User Exposed, the corresponding parameters in the attribute in the scene can be specified, for example, referring to the Static Mesh in the scene as an object that collides and interacts with particles, as shown in FIG. 5, PhysionGroundSdf in FIG. 5 specifies the plane in the scene as the ground, while PhysionSkeletalMeshSdf specifies a reptile in the scene as the object that specifies the skeletal animation.

In a word, in the stage of System Spawn, the main function is to reset each parameter in the Scenario and then initialize Sdf. However, other contents are not initialized in the stage of System Spawn, because the initialization of other parts needs to depend on particle information, while in the stage of System Spawn, particles have not been generated, but are generated in the stage of Particle Spawn. Therefore, in the stage of System Spawn, only Sdf with no dependence on the particles can be initialized, while other parts need to be completed later.

2. System Update: this module mainly includes the following modules:
   1) NM Init Scenario: including invoking the initialization function of the scene manager, using the data initialized by the geometry manager and boundary condition manager, transmitting all data to the GPU end, and completing other lower-level data preparation work.
   2) NM Update Skeletal Mesh Sdf: Skeletal Mesh will move continuously during animation playback, skeletal Mesh Sdf information needs to be updated every frame. Therefore, it needs to invoke this module in the System Update stage to update Skeletal Mesh Sdf in the scene. The number of NM Update Mesh Sdfs needing to be added is consistent with the number of the Skeletal Mesh Sdfs participating in calculation in the scene, and they are specified as corresponding Skeletal Meshes, respectively.
   3) NM Update Physion. This module is used for driving Scenario to solve the particle physical state of the current frame, and update the position of all particles and other information, which needs to invoke each frame, including updating the force value, life cycle, etc. of each physical special effect particle in the data buffer region of physion, and driving the particle to simulate the motion state of the next frame.

3. Emitter Spawn: this module includes the following modules:
   1) Set PhysionGeometry. In this module, the emitter attribute PhysionGeometry can be set, i.e., an instance of the NiagaraDataInterfaceGeometry as the Emitter attribute; the attribute parameter of PhysionGeometry can be set in this module, please refer to FIG. 4 for details.
   2) NM Reset Geometry. The function of this module is clearing data in Geometry of the previous simulation when each Niagara circulation starts, and resetting Geometry as the initial state to prepare for the next simulation.

4. Emitter Update: this module mainly includes the following parts:
   1) Emitter State and Spawn Burst Instantaneous: the two modules are original modules of Niagara, where Emitter State can specify some Emitter attribute parameters, while Spawn Burst Instantaneous specifies the number of particles generated at a certain moment.
   2) NM Init Geometry: this module is used for initializing Geometry. The main process is: through the data buffer region of the Niagara for storing particle data, and then according to the layout situation of the particle attributes, obtaining particle position, mass, serial number, life cycle, and other attributes, copying these attributes for GPU to GPU data transfer into the scene manager to prepare data for subsequent initialization work of the Scenario.

3) NM Update Geometry: this module is mainly used for updating the relevant information of corresponding physical special effect particles in the current geometry manager every frame, including: 1) Read the force value of the physical special effect particles in the data buffer region of Niagara. 2) Write the particle position, velocity, and other information of the current frame solved in Physion into the data buffer region of Niagara to prepare data for rendering. 3) Update the life state of each particle and count dead particles in real time.

5. Particle Spawn, this module mainly includes the following parts:
   1) Initialize Particle: this module is an original module of Niagara. Its function is to set some attribute values of each particle, such as life cycle, color, mass, and render radius.

Although this module is a Niagara original module, it can also indirectly achieve the function of controlling Physion simulation. Taking mass as an example, when the particle is set according to the mass of Niagara, the data of each particle mass stored in the data buffer region of Niagara will be copied during Physion initialization. The GPU to GPU operation is used for initializing the mass of each particle in Physion to achieve the purpose of setting the mass of the particles in Physion.

2) Emission position control module: the function thereof is to control particle generation in the preset model. The preset model can be regular or irregular geometry, such as the model of a ring, a sphere, and a cone. The preset model may also be a mesh, such as Static Mesh or Skeletal Mesh.

Figure 11:
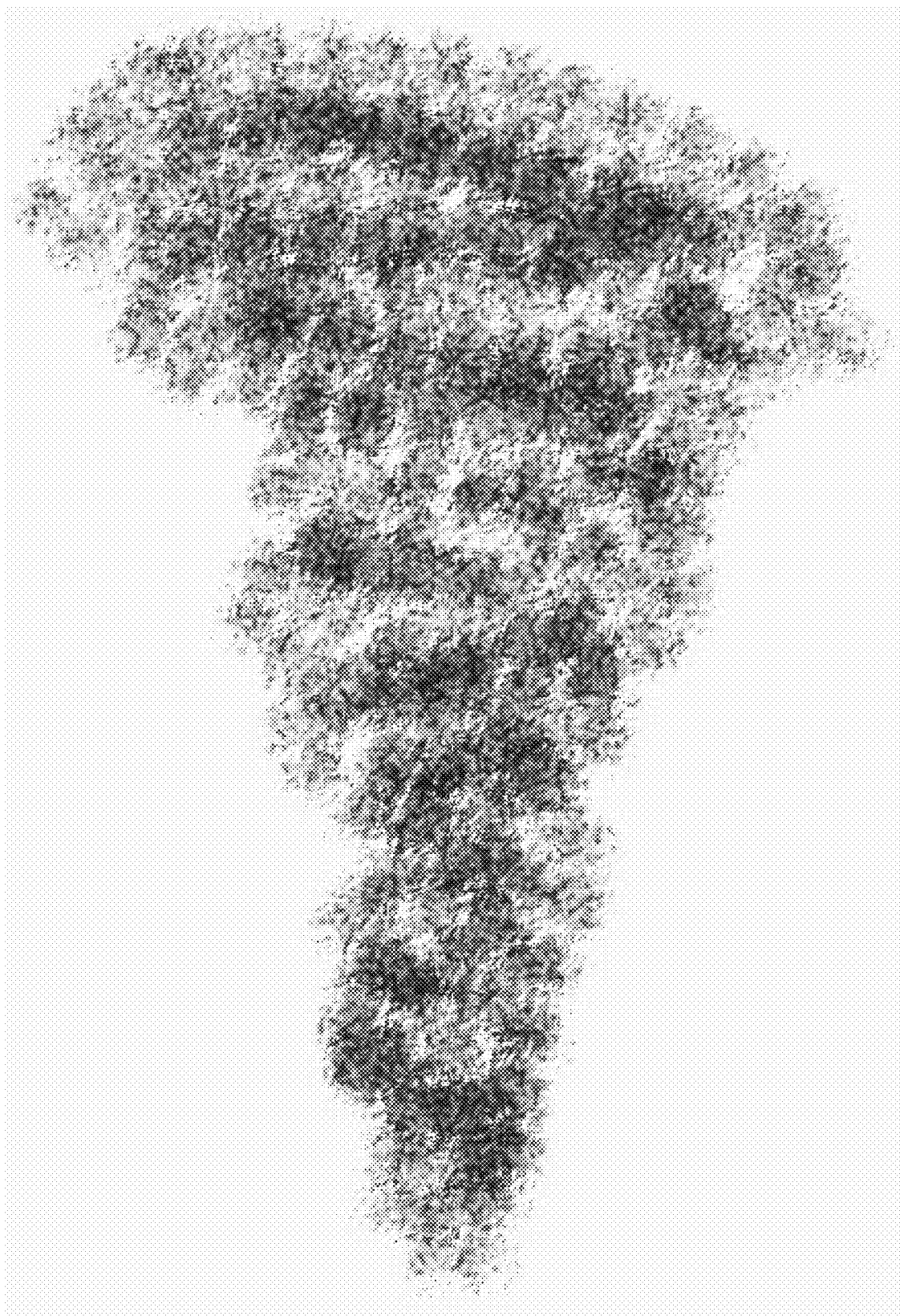
FIG. 11 is an effect diagram of particle rotation in an embodiment.

6. Particle Update: this module mainly includes the following parts:
   1) Particle State: this module is the original module of Niagara. It is mainly used for setting the state of particles, such as setting the life cycle of particles, setting particles to die at the end of the life cycle, etc.
   2) Gravity Force: this module is the original module of Niagara, which adds a gravity effect to each particle. Similarly, there are other control force modules, which can achieve a variety of particle motion effects by adding multiple different control forces. As shown in FIG. 11, the particle rotation effect can be achieved by adding gravity, line attraction, crimp noise, and vortex force.

In the particle emission plug-in provided by the embodiment of this application, the module script of Niagara's original controlling force module is reused to add an external force to the particle to control the particle motion, so as to better fuse with Niagara. At the same time, it is in line with the artist's usage habits, so as to facilitate the reuse of some effects.

3) NM Physion Solve Forces and Velocity. Since the GPU Buffer content of Niagara can only be obtained from the Buffer that stores the particle attribute value during running, in the module of NM Physion Solve Forces and Velocity, a resultant force value obtained from solving is stored in the particle attribute, to facilitate reading during Physion emulation.
   4) NM Set Deleted Particle Index: the function thereof is to obtain a survival state of each particle in the current Emitter in real time during running, obtain survival information of each particle at each frame, and write the information into a data buffer region corresponding to the geometry manager. Therefore, at the Physion side, it can obtain the real particle survival state at each frame and synchronize the information of dead particles.

Figure 12:
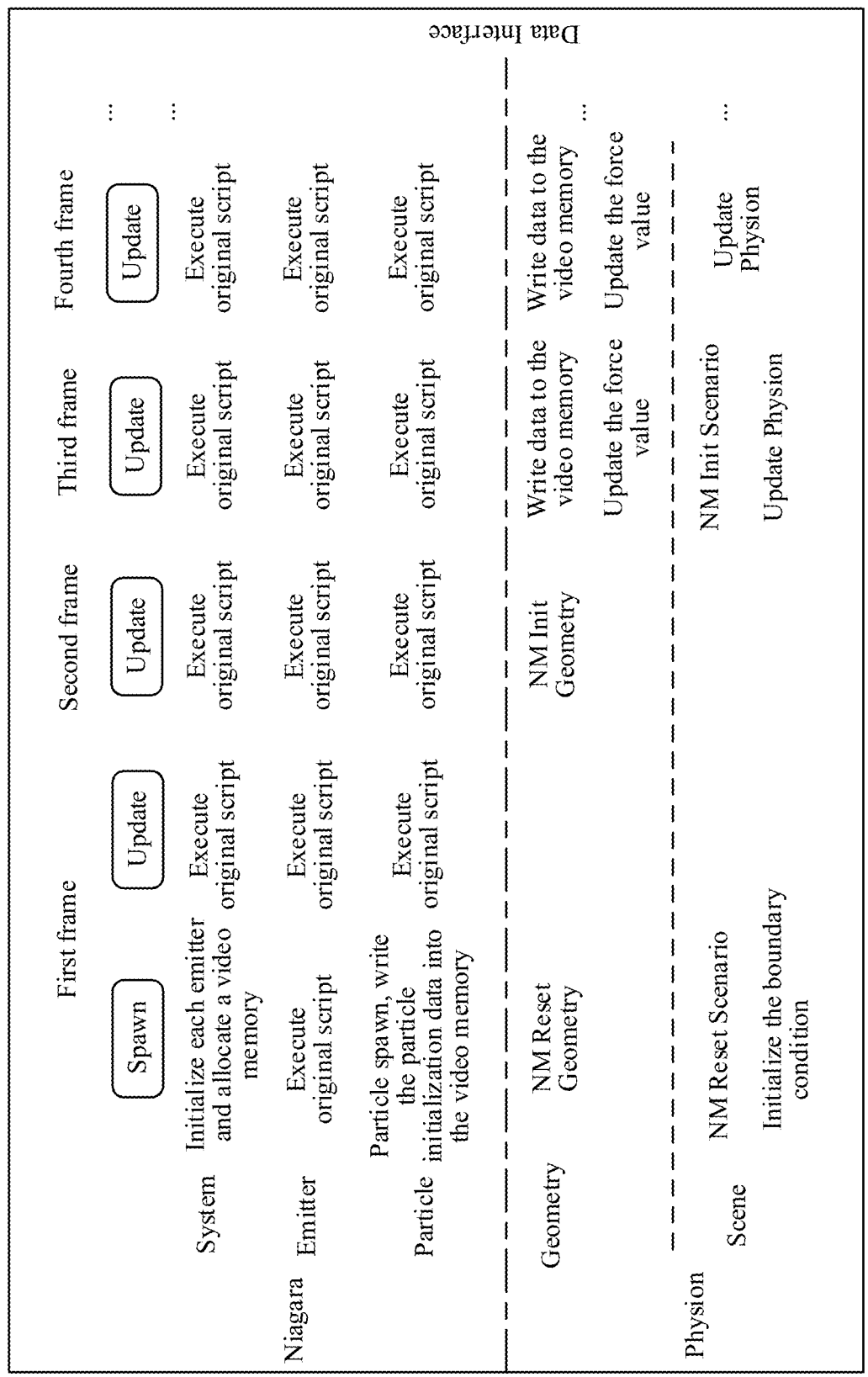
FIG. 12 is a flowchart of invoking of a simulation process in an embodiment.

FIG. 12 is a flowchart of invoking of the particle emission plug-in in a motion process in an embodiment. With reference to FIG. 12, due to the particle emission plug-in integrated with Physion, Niagara has some additional steps in each stage besides needing to execute the original script (i.e., the original script in Niagara). The following illustrates the additional steps performed during the running process and important steps in the original script in combination with the drawing:

I. First Frame:
  1. Execute System and All Emitter Spawn Phase Logics:
  1.1. System Production Phase
     1). Initialize each emitter and conduct video memory allocation, and at the same time, set the scene manager, i.e., setting all input parameters of Scenario.
     2). Reset the scene manager: Reset all contents in the scene manager, delete previous simulation results, and prepare for a new simulation.
     3). Initialize the boundary condition: Initialize all the boundary conditions in the current system.
  1.2. Emitter Production Phase
     1). Set the geometry manager: set all input parameters of the geometry manager.
     2). Reset the geometry manager: Reset all contents in the geometry manager, delete previous results, and prepare for a new simulation.
  2. Generate Particles:
  2.1. Emitter Update: Execute the original scrip, i.e., determining the number of particles generated according to the Niagara's original module, Spawn Burst Instantaneous.
  2.2. Particle Production: Execute the original scrip, i.e., according to the number of generated particles specified in the update stage of the emitter, generating particles, specifying the various attribute values of the newborn particles, including position, speed, etc., and writing the attribute data of the particles into the allocated video memory.

II. Second Frame:
  Emitter Update: Since particles have been generated at the first frame, in this stage, the geometry manager reads the attribute data in the corresponding video memory of the emitter, makes a GPU to GPU copy of the data that stores the related attributes of each particle, copies same to the corresponding video memory of the geometry manager, and initializes the geometry manager.

III. Third Frame:
  1. System Update: Since the video memory in the geometry manager has been initialized at the second frame, the scene manager reads all the data in the geometry manager in the third frame, initializes the scene manager, and starts simulation to solve the new position, speed and other data of particles.
  2. Emitter Update: The geometry manager reads the solved data stored in the corresponding video memory of the scene manager, obtains the position, velocity, and other data of particles, and makes a GPU to GPU copy, copies the new position, velocity, and other data to the corresponding video memory of Niagara, and completes the particle update.
  3. Emitter Update: The geometry manager can also read the force value of particles in the video memory corresponding to Niagara, make a GPU to GPU copy, and write it into the video memory corresponding to the geometry manager.

4. System Update: The scene manager reads the force value and updates Physion.

IV. Fourth Frame:

System Update: Simulate the next frame and solve the particle's new position, velocity, etc.

Emitter Update: Repeat the operation at the third frame, make a GPU to GPU copy, copy the new position, velocity, and other data to the corresponding video memory of Niagara, and complete the particle update.

V. Repeat the steps in the fourth frame until the last frame of the physical special effect.

It is to be understood that, although the steps in the flowchart above are sequentially shown according to indication of an arrow, the steps are not necessarily sequentially performed according to a sequence indicated by the arrow. Unless otherwise explicitly specified in this application, execution of the steps is not strictly limited, and the steps may be performed in other sequences. Moreover, at least part of the steps in the flowchart may include a plurality of sub-steps or a plurality of stages. These sub-steps or stages are not necessarily executed at the same time, but can be executed at different times. The order of execution of these sub-steps or stages is not necessarily performed sequentially, but may be performed in turn or alternately with other steps or at least a part of sub-steps or stages of other steps.

Figure 13:
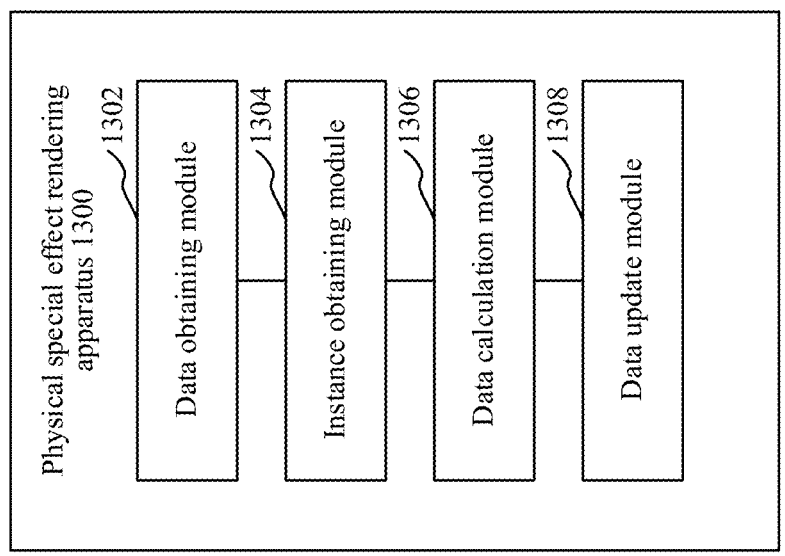
FIG. 13 is a structural block diagram of a physical special effect rendering apparatus in an embodiment.

In one embodiment, as shown in FIG. 13, a physical special effect rendering apparatus 1300 is provided. The apparatus may adopt a software module or a hardware module, or a combination of the two to become a part of the computer device. The apparatus specifically includes:

a data obtaining module 1302, configured to obtain physical special effect data of physical special effect particles emitted by a particle emission plug-in in a previous frame;

an instance obtaining module 1304, configured to obtain a first target instance obtained by instantiating a scene management class; the scene management class inheriting from a target base class provided by the particle emission plug-in;

a data calculation module 1306, configured to invoke, through the first target instance, a scene management interface of a particle simulation tool integrated in the particle emission plug-in to calculate motion state information of the physical special effect particles in a current frame based on the physical special effect data in the previous frame in a scene manager of the particle simulation tool;

a data update module 1308, configured to update the physical special effect data in the previous frame based on the motion state information of the current frame to render a physical special effect in the current frame.

In the physical special effect rendering apparatus, the physical special effect data of physical special effect particles emitted by a particle emission plug-in in a previous frame is obtained, to obtain the first target instance obtained by instantiating the scene management class. The scene management class inherits from the target base class provided by the particle emission plug-in; and invoke the scene management interface of the particle simulation tool integrated in the particle emission plug-in through the first target instance, so as to, in the scene manager of the particle simulation tool, calculate the motion state information of the physical special effect particles in the current frame based on the physical special effect data in the previous frame, and update the physical special effect data in the previous frame based on the motion state information of the current frame to render to obtain the physical special effect in the current frame. Since the particle simulation tool is integrated in the particle emission plug-in, through the first target instance obtained by instantiating the scene management class, the scene management interface of the particle simulation tool can be invoked, to calculate in the scene manager of the particle simulation tool to obtain the motion state information, so as to render to obtain the physical special effect, avoid obtaining the simulation result externally, and improve the efficiency during physical special effect rendering.

In an embodiment, the apparatus further includes: a first target instance generating module, configured to determine a base class used for invoking a data interface provided by the particle simulation tool from a set of base classes provided by the particle emission plug-in, to obtain the target base class; create the scene management class inheriting from the target base class to invoke the scene management interface of the particle simulation tool; instantiate the scene management class to obtain a first target instance.

In one embodiment, the first target instance generating module is also configured to create an object corresponding to the scene management class to obtain a scene management object; package the scene management object to obtain a first target object; configure the first target object as a first attribute of the particle emission plug-in to obtain the first target instance.

In an embodiment, the apparatus further includes a scene manager configuration module, configured to obtain a first attribute value by configuring an attribute parameter of the first attribute through a configuration interface of the particle emission plug-in; use the first attribute value as a variable value corresponding to the first target instance; configure a parameter of the scene manager corresponding to the scene management interface through the variable value corresponding to the first target instance, to obtain a configured scene manager for scene management in the particle simulation tool.

In an embodiment, a data update module is also configured to obtain a second target instance obtained by instantiating a geometry management class; the geometry management class inheriting from a target base class provided by the particle emission plug-in; invoke a geometry management interface of the particle simulation tool through the second target instance to write the motion state information of the current frame into a target video memory through a geometry manager in the particle simulation tool, and update the physical special effect data in the previous frame in the target video memory based on the motion state information of the current frame, to render a physical special effect in the current frame.

In an embodiment, the apparatus further includes: a second target instance generating module, configured to create a geometry management class inheriting from the target base class to invoke the geometry management interface of the particle simulation tool; create an object corresponding to the geometry management class to obtain a geometry management object, and package the geometry management object to obtain a second target object; configure the second target object as a second attribute of the particle emission plug-in to obtain the second target instance.

In an embodiment, the apparatus further includes: a geometry manager configuration module, configured to obtain a second attribute value by configuring an attribute parameter of the second attribute through a configuration interface of the particle emission plug-in; use the second attribute value as a variable value corresponding to the second target instance; configure a geometry manager corresponding to the geometry management interface through the variable value corresponding to the second target instance, to obtain a configured geometry manager for geometry management in the particle simulation tool.

In an embodiment, the apparatus further includes a boundary condition generating module, configured to obtain a third target instance obtained by instantiating a boundary condition management class; the boundary condition management class inheriting from a target base class provided by the particle emission plug-in; and invoke, through the third target instance, a boundary condition management interface of the particle simulation tool to obtain a target boundary condition in a boundary condition manager of the particle simulation tool; and a data calculation module, further configured to calculate the motion state information of the physical special effect particles in the current frame based on the physical special effect data in the previous frame and the target boundary condition in the scene manager of the particle simulation tool.

In an embodiment, the apparatus further includes: a third target instance generating module, configured to create a boundary condition management class inheriting from the target base class to invoke the boundary condition management interface of the particle simulation tool; create a target derived class inheriting from the boundary condition management class and corresponding to a type configuration parameter, and instantiate the target derived class to obtain the third target instance; where the type configuration parameter is a parameter obtained by configuring the type of the boundary condition manager obtained through a configuration interface of the particle emission plug-in.

In one embodiment, the third target instance generating module is also configured to create an object corresponding to the target derived class to obtain a target boundary condition management object; package the target boundary condition management object to obtain a third target object; configure the third target object as a third attribute of the particle emission plug-in to obtain the third target instance.

In an embodiment, the apparatus further includes a boundary condition manager configuration module, configured to obtain a third attribute value by configuring an attribute parameter of the third attribute through a configuration interface of the particle emission plug-in; use the third attribute value as a variable value corresponding to the third target instance; configure a parameter of the boundary condition manager corresponding to the boundary condition management interface through the variable value corresponding to the third target instance, to obtain a configured boundary condition manager for boundary condition management in the particle simulation tool.

In an embodiment, the data calculation module is further configured to calculate the motion state information of the physical special effect particles in the current frame based on the physical special effect data in the previous frame in the scene manager of the particle simulation tool and writing the motion state information in a first video memory; and a data update module is further configured to read the motion state information of the current frame from the first video memory and copying the motion state information of the current frame; write the copied motion state information in a second video memory, and updating the physical special effect data in the previous frame based on the motion state information of the current frame in the second video memory; where the first video memory is a data buffer region allocated to the particle simulation tool in a target video memory of the particle emission plug-in; and the second video memory is a data buffer region different from the first video memory in the target video memory for storing particle emission data and particle rendering data.

In an embodiment, the apparatus further includes a sampling module, configured to emit a preset number of initial particles at a position of a preset model, and write attribute information of the initial particles into a second video memory; read the attribute information of the initial particles from the second video memory and copy the attribute information of the initial particles; write the copied attribute information of the initial particles into a first video memory, and sample, through the particle simulation tool, a surface and an interior of the preset model based on the attribute information of the initial particles in the first video memory to obtain physical special effect particles for physical special effect simulation.

In an embodiment, the data update module is also configured to map the physical special effect data in the previous frame to a preset background grid in the scene manager of the particle simulation tool; the preset background grid including a plurality of grid nodes; calculate motion state information of the grid node corresponding to each physical special effect particle in the current frame based on the physical special effect data in the background grid; map the motion state information of each grid node to the corresponding physical special effect particle to obtain the motion state information of each physical special effect particle in the current frame.

Specific definitions of the physical special effect rendering apparatus can refer to definitions for the physical special effect rendering method in the text above, and the details are not repeated herein. Each module in the physical special effect rendering apparatus may be implemented entirely or partially through software, hardware, or a combination thereof. Each module above may be embedded in or independent from a processor of the computer device in a hardware form, and may also be stored in a memory in the computer device in a software form, to facilitate the processor to invoke to execute operations corresponding to the modules.

In an embodiment, a computer device is provided. The computer device may be a terminal and an internal structural diagram thereof may be shown in FIG. 14. The computer device includes a processor, a storage, a network interface, a display screen, and an input apparatus that are connected by using a system bus. The processor of the computer device is configured to provide computation and control ability. The memory of the computer device includes a non-volatile storage medium and an inner memory. The non-volatile storage medium stores an operating system and computer-readable instructions. The inner memory provides an operating environment for the operating system and the computer-readable instructions in the non-volatile storage medium. The communication interface of the computer device is configured to communicate with the external terminal in a wired or wireless manner; the wireless manner may be implemented through WIFI, carrier networks, near field communication (NFC) or other technologies. The computer-readable instructions are executed to implement a physical special effect rendering method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 14:
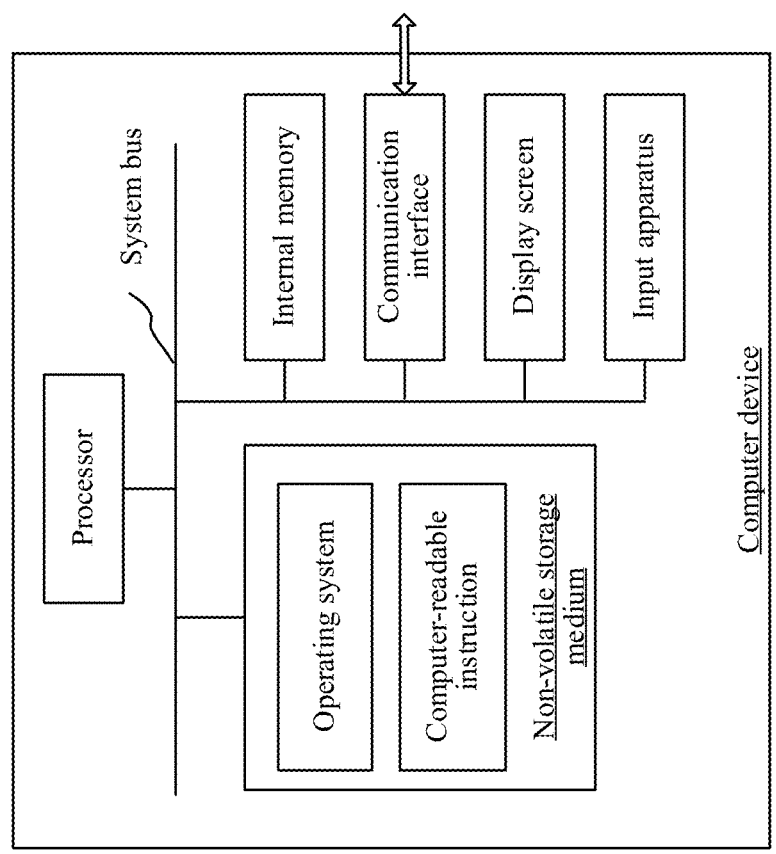
FIG. 14 is a diagram of an internal structure of a computer device in an embodiment.

A person skilled in the art may understand that the structure shown in FIG. 14 is only a block diagram of a partial structure related to the solution of this application, and does not limit the computer device to which the solution of this application is applied. Specifically, the computer device may include more or less components than those shown in the figure, or some components may be combined, or different component deployment may be used.

In an embodiment, a computer device is further provided, including: a memory and a processor, the memory storing computer-readable instructions, and the computer-readable instructions, when executed by the processor, implementing the steps in the embodiment of the methods above.

In an embodiment, a computer-readable storage medium is provided, and stores a computer-readable instruction, when being executed by a processor, implementing the steps in the embodiment of the methods above.

In an embodiment, a computer program product or computer-readable instruction is provided. The computer program product or computer-readable instruction include computer instructions stored in a computer-readable storage medium. The processor of the computer device reads the computer instructions from the computer-readable storage medium, and the processor executes the computer instructions, so that the computer device performs steps in the method embodiment.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to the memory, the storage, the database, or other medium used in the embodiments provided in this application may all include at least one of a non-volatile memory and a volatile memory. The non-volatile memory may include Read-Only Memory (ROM), magnetic tape, floppy disk, flash, optical memory, etc. The volatile memory may include a Random Access Memory (RAM) or an external cache. As an illustration rather than a limitation, RAM can be in many forms, such as Static Random Access Memory (SRAM) or Dynamic Random Access Memory (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing embodiments merely express several implementations of this application. The descriptions thereof are relatively specific and detailed, but should not be understood as limitations to the scope of this application. It should be noted that for a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A physical special effect rendering method performed by a computer device, and comprising:
   obtaining physical special effect data of physical special effect particles emitted by a particle emission plug-in in a previous frame;
   obtaining a first target instance obtained by instantiating a scene management class;
   invoking, through the first target instance, a scene manager of a particle simulation tool to calculate motion state information of the physical special effect particles in a current frame based on the physical special effect data in the previous frame; and
   updating the physical special effect data in the previous frame based on the motion state information of the current frame to render a physical special effect in the current frame, further including:
   obtaining a second target instance obtained by instantiating a geometry management class, the geometry management class inheriting from a target base class provided by the particle emission plug-in; and
   invoking a geometry management interface of the particle simulation tool through the second target instance to write the motion state information of the current frame into a target video memory through a geometry manager in the particle simulation tool, and updating the physical special effect data in the previous frame in the target video memory based on the motion state information of the current frame, to render a physical special effect in the current frame.

2. The method according to claim 1, wherein the first target instance is generated through the following steps:
   determining a base class used for invoking a data interface provided by the particle simulation tool from a set of base classes provided by the particle emission plug-in, to obtain a target base class;
   creating the scene management class inheriting from the target base class to invoke the scene management interface of the particle simulation tool; and
   instantiating the scene management class to obtain the first target instance.

3. The method according to claim 1, wherein the method further comprises:
   obtaining a third target instance obtained by instantiating a boundary condition management class; the boundary condition management class inheriting from a target base class provided by the particle emission plug-in; and
   invoking, through the third target instance, a boundary condition management interface of the particle simulation tool to obtain a target boundary condition in a boundary condition manager of the particle simulation tool; and
   the calculating motion state information of the physical special effect particles in a current frame based on the physical special effect data in the previous frame in a scene manager of the particle simulation tool comprising:

calculating the motion state information of the physical special effect particles in the current frame based on the physical special effect data in the previous frame and the target boundary condition in the scene manager of the particle simulation tool.

4. The method according to claim 1, wherein the calculating motion state information of the physical special effect particles in a current frame based on the physical special effect data in the previous frame in a scene manager of the particle simulation tool comprises:

calculating the motion state information of the physical special effect particles in the current frame based on the physical special effect data in the previous frame in the scene manager of the particle simulation tool; and updating the physical special effect data in the previous frame based on the motion state information of the physical special effect particles in the current frame.

5. The method according to claim 1, wherein the method further comprises:

emitting a preset number of initial particles at a position of a preset model; and sampling, through the particle simulation tool, a surface and an interior of the preset model based on the attribute information of the preset number of initial particles to obtain physical special effect particles for physical special effect simulation.

6. The method according to claim 1, wherein the calculating motion state information of the physical special effect particles in a current frame based on the physical special effect data in the previous frame in a scene manager of the particle simulation tool comprises:

mapping the physical special effect data in the previous frame to a preset background grid in the scene manager of the particle simulation tool; the preset background grid comprising a plurality of grid nodes;

calculating motion state information of the grid node corresponding to each physical special effect particle in the current frame based on the physical special effect data in the background grid; and mapping the motion state information of each grid node to the corresponding physical special effect particle to obtain the motion state information of each physical special effect particle in the current frame.

7. The method according to claim 1, wherein the calculating motion state information of the physical special effect particles in a current frame based on the physical special effect data in the previous frame comprises:

sequentially determining a current time step for the current frame, and calculating motion state information of physical special effect particles in the current time step based on the physical special effect data of the physical special effect particles in a previous time step of the current time step; and determining motion state information of the physical special effect particles in an ending time step as the motion state information of the physical special effect particles in the current frame.

8. A computer device, comprising a memory and one or more processors, the memory storing computer-readable instructions, and the computer-readable instructions, when executed by the one or more processors, causing the computer device to perform a physical special effect rendering method including:

obtaining physical special effect data of physical special effect particles emitted by a particle emission plug-in in a previous frame;

obtaining a first target instance obtained by instantiating a scene management class;

invoking, through the first target instance, a scene manager of a particle simulation tool to calculate motion state information of the physical special effect particles in a current frame based on the physical special effect data in the previous frame; and updating the physical special effect data in the previous frame based on the motion state information of the current frame to render a physical special effect in the current frame, further including:

obtaining a second target instance obtained by instantiating a geometry management class, the geometry management class inheriting from a target base class provided by the particle emission plug-in; and invoking a geometry management interface of the particle simulation tool through the second target instance to write the motion state information of the current frame into a target video memory through a geometry manager in the particle simulation tool, and updating the physical special effect data in the previous frame in the target video memory based on the motion state information of the current frame, to render a physical special effect in the current frame.

9. The computer device according to claim 8, wherein the first target instance is generated through the following steps:

determining a base class used for invoking a data interface provided by the particle simulation tool from a set of base classes provided by the particle emission plug-in, to obtain a target base class;

creating the scene management class inheriting from the target base class to invoke the scene management interface of the particle simulation tool; and instantiating the scene management class to obtain the first target instance.

10. The computer device according to claim 8, wherein the method further comprises:

obtaining a third target instance obtained by instantiating a boundary condition management class; the boundary condition management class inheriting from a target base class provided by the particle emission plug-in; and invoking, through the third target instance, a boundary condition management interface of the particle simulation tool to obtain a target boundary condition in a boundary condition manager of the particle simulation tool; and the calculating motion state information of the physical special effect particles in a current frame based on the physical special effect data in the previous frame in a scene manager of the particle simulation tool comprising:

calculating the motion state information of the physical special effect particles in the current frame based on the physical special effect data in the previous frame and the target boundary condition in the scene manager of the particle simulation tool.

11. The computer device according to claim 8, wherein the calculating motion state information of the physical special effect particles in a current frame based on the physical special effect data in the previous frame in a scene manager of the particle simulation tool comprises:

calculating the motion state information of the physical special effect particles in the current frame based on the physical special effect data in the previous frame in the scene manager of the particle simulation tool; and updating the physical special effect data in the previous frame based on the motion state information of the physical special effect particles in the current frame.

12. The computer device according to claim 8, wherein the method further comprises:
    emitting a preset number of initial particles at a position of a preset model; and
    sampling, through the particle simulation tool, a surface and an interior of the preset model based on the attribute information of the preset number of initial particles to obtain physical special effect particles for physical special effect simulation.

13. The computer device according to claim 8, wherein the calculating motion state information of the physical special effect particles in a current frame based on the physical special effect data in the previous frame in a scene manager of the particle simulation tool comprises:
    mapping the physical special effect data in the previous frame to a preset background grid in the scene manager of the particle simulation tool; the preset background grid comprising a plurality of grid nodes;
    calculating motion state information of the grid node corresponding to each physical special effect particle in the current frame based on the physical special effect data in the background grid; and
    mapping the motion state information of each grid node to the corresponding physical special effect particle to obtain the motion state information of each physical special effect particle in the current frame.

14. The computer device according to claim 8, wherein the calculating motion state information of the physical special effect particles in a current frame based on the physical special effect data in the previous frame comprises:
    sequentially determining a current time step for the current frame, and calculating motion state information of physical special effect particles in the current time step based on the physical special effect data of the physical special effect particles in a previous time step of the current time step; and
    determining motion state information of the physical special effect particles in an ending time step as the motion state information of the physical special effect particles in the current frame.

15. A non-transitory computer-readable storage medium, storing computer-readable instructions, the computer-readable instructions, when executed by one or more processors of a computer device, causing the computer device to perform a physical special effect rendering method including:
    obtaining physical special effect data of physical special effect particles emitted by a particle emission plug-in in a previous frame;
    obtaining a first target instance obtained by instantiating a scene management class;
    invoking, through the first target instance, a scene manager of a particle simulation tool to calculate motion state information of the physical special effect particles in a current frame based on the physical special effect data in the previous frame; and
    updating the physical special effect data in the previous frame based on the motion state information of the current frame to render a physical special effect in the current frame, further including:
    obtaining a second target instance obtained by instantiating a geometry management class, the geometry management class inheriting from a target base class provided by the particle emission plug-in; and
    invoking a geometry management interface of the particle simulation tool through the second target instance to write the motion state information of the current frame into a target video memory through a geometry manager in the particle simulation tool, and updating the physical special effect data in the previous frame in the target video memory based on the motion state information of the current frame, to render a physical special effect in the current frame.

16. The non-transitory computer-readable storage medium according to claim 15, wherein the first target instance is generated through the following steps:
    determining a base class used for invoking a data interface provided by the particle simulation tool from a set of base classes provided by the particle emission plug-in, to obtain a target base class;
    creating the scene management class inheriting from the target base class to invoke the scene management interface of the particle simulation tool; and
    instantiating the scene management class to obtain the first target instance.

17. The non-transitory computer-readable storage medium according to claim 15, wherein the method further comprises:
    obtaining a third target instance obtained by instantiating a boundary condition management class; the boundary condition management class inheriting from a target base class provided by the particle emission plug-in; and
    invoking, through the third target instance, a boundary condition management interface of the particle simulation tool to obtain a target boundary condition in a boundary condition manager of the particle simulation tool; and
    the calculating motion state information of the physical special effect particles in a current frame based on the physical special effect data in the previous frame in a scene manager of the particle simulation tool comprising:
    calculating the motion state information of the physical special effect particles in the current frame based on the physical special effect data in the previous frame and the target boundary condition in the scene manager of the particle simulation tool.

\* \* \* \* \*